(12) United States Patent
Rüter et al.

(10) Patent No.: US 11,139,520 B2
(45) Date of Patent: Oct. 5, 2021

(54) CELL BLOCK WITH CELL FIXATION FOR A BATTERY AND METHOD OF ASSEMBLING A CELL BLOCK

(71) Applicant: Lisa Dräxlmaier GmbH, Vilsbiburg (DE)

(72) Inventors: Karsten Rüter, Landshut (DE); Martin Huber, Neufahrn/Nb. (DE); Guido Hofer, Weng (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 814 days.

(21) Appl. No.: 14/260,686

(22) Filed: Apr. 24, 2014

(65) Prior Publication Data
US 2014/0322581 A1    Oct. 30, 2014

(30) Foreign Application Priority Data

Apr. 25, 2013   (DE) .................... 10 2013 207 536.7

(51) Int. Cl.
*H01M 50/20*    (2021.01)
*H01M 50/202*   (2021.01)
(Continued)

(52) U.S. Cl.
CPC ......... *H01M 50/20* (2021.01); *H01M 50/202* (2021.01); *H01M 50/503* (2021.01);
(Continued)

(58) Field of Classification Search
None
See application file for complete search history.

(56) References Cited

U.S. PATENT DOCUMENTS 6,379,837 B1 *  4/2002  Takahashi ............... H01M 2/08
                                                    429/120
6,399,238 B1 *  6/2002  Oweis ................. H01M 2/1077
                                                    429/100
(Continued)

FOREIGN PATENT DOCUMENTS

DE    10 2008 010 838 A1    8/2009
DE    10 2008 034 873 A1    1/2010
(Continued)

OTHER PUBLICATIONS

3M Technical Data 2012 Thermally Conductive Heat Spreading Tape (Year: 2012).*

*Primary Examiner* — Ula C Ruddock
*Assistant Examiner* — Anna Korovina
(74) *Attorney, Agent, or Firm* — Finnegan, Henderson, Farabow, Garrett & Dunner LLP

(57) ABSTRACT

The present disclosure relates to a cell block for a battery and a method for assembling a cell bock having one or more battery cells. In one implementation, the cell block includes a box-shaped housing, which is open on one side and into which the battery cells are fitted through the open side, and a cell fixation, which is pushed through the open side into the housing, such that the battery cells are fixed in the housing and the housing is at least partially closed. The cell fixation may further include one or more bond openings, through which the battery cells may be accessed after the cell fixation has been pushed in, and a projecting collar on the side of the cell fixation facing away from the battery cells, such that the collar may be brought into contact with an end plate.

15 Claims, 14 Drawing Sheets

(51) Int. Cl.
*H01M 50/503* (2021.01)
*H01M 50/213* (2021.01)

(52) U.S. Cl.
CPC ...... *H01M 50/213* (2021.01); *H01M 2220/20* (2013.01); *Y10T 29/49108* (2015.01)

(56) References Cited

U.S. PATENT DOCUMENTS

| | | | |
|---|---|---|---|
| 6,410,185 B1* | 6/2002 | Takahashi | B60K 6/28 |
| | | | 429/163 |
| 2005/0022966 A1* | 2/2005 | Takahashi | H01M 2/10 |
| | | | 165/80.1 |
| 2010/0104936 A1* | 4/2010 | Meintschel | H01M 2/06 |
| | | | 429/120 |
| 2011/0020678 A1* | 1/2011 | Straubel | H01M 2/105 |
| | | | 429/71 |
| 2011/0076538 A1* | 3/2011 | Kreiner | H01M 2/1083 |
| | | | 429/99 |
| 2011/0165446 A1* | 7/2011 | Hermann | H01M 2/105 |
| | | | 429/99 |
| 2011/0195284 A1* | 8/2011 | Yasui | H01M 2/0242 |
| | | | 429/82 |
| 2012/0114996 A1* | 5/2012 | Yu | H01M 2/1077 |
| | | | 429/99 |
| 2012/0263995 A1* | 10/2012 | Naito | H01M 2/1077 |
| | | | 429/146 |
| 2013/0230761 A1* | 9/2013 | Okutani | H01M 2/206 |
| | | | 429/158 |

FOREIGN PATENT DOCUMENTS

| | | | | |
|---|---|---|---|---|
| DE | 10 2008 059 967 A1 | 6/2010 | | |
| JP | WO 2012073399 A1 * | 6/2012 | ............ | H01M 2/206 |
| WO | WO-2012073399 A1 * | 6/2012 | ............ | H01M 2/206 |

* cited by examiner

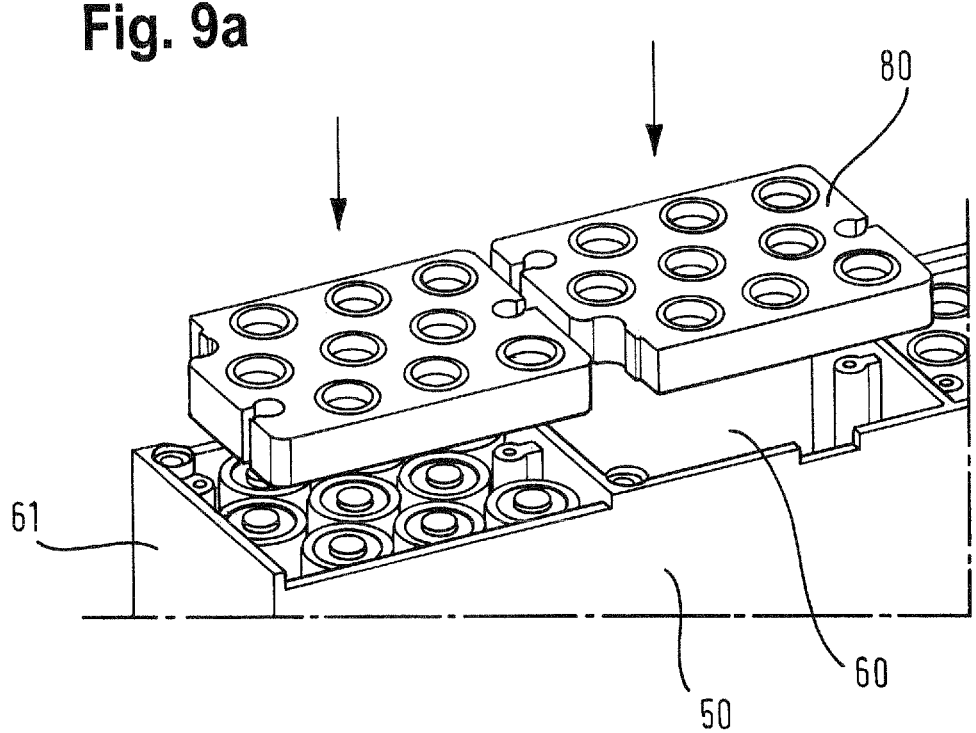
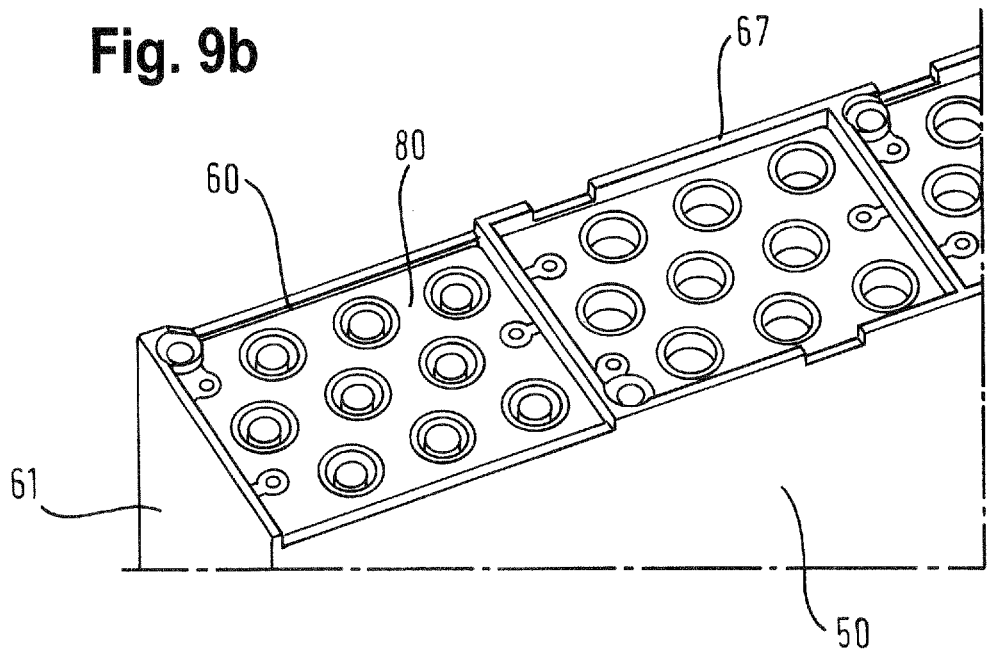

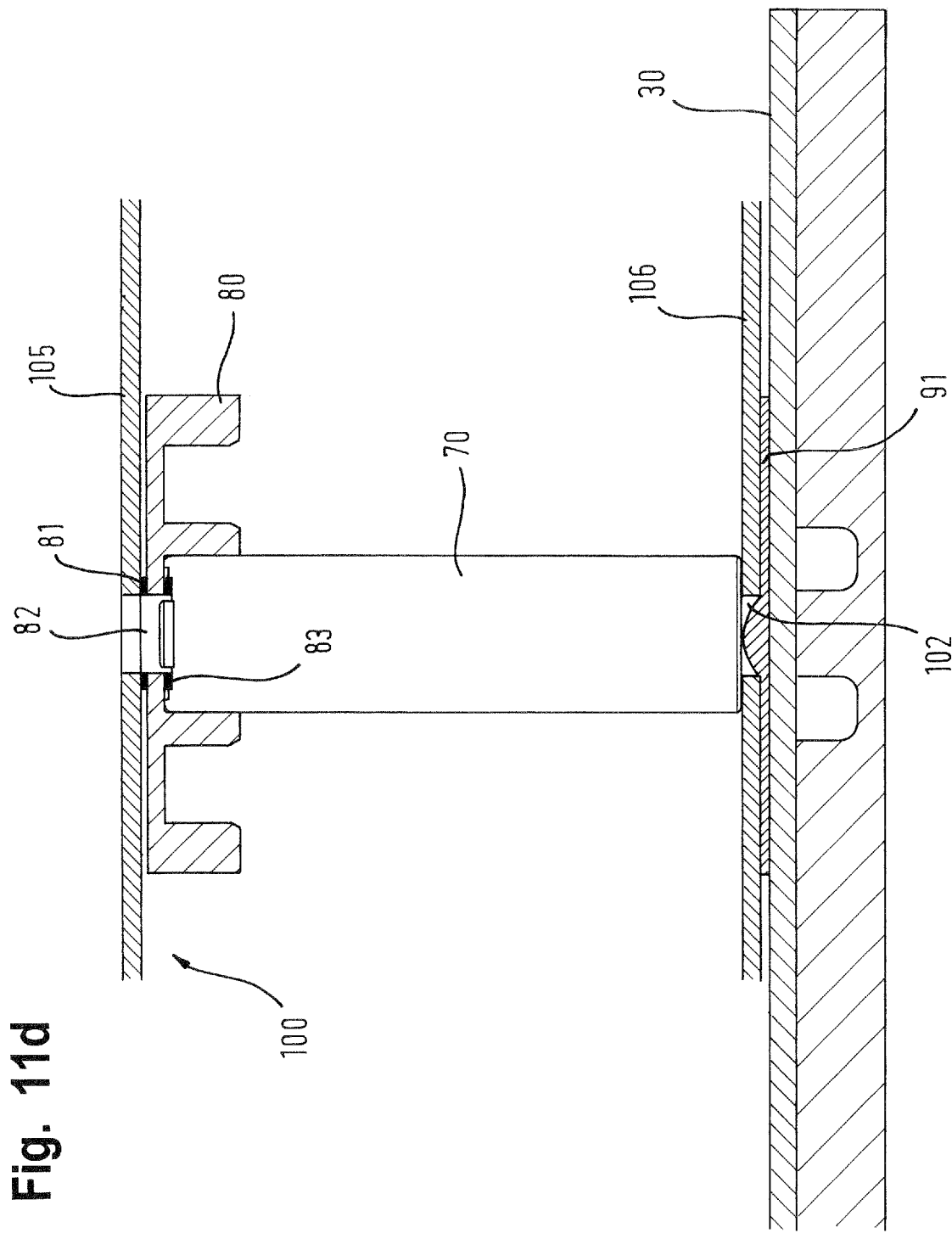

CELL BLOCK WITH CELL FIXATION FOR A BATTERY AND METHOD OF ASSEMBLING A CELL BLOCK

CROSS-REFERENCE TO RELATED APPLICATIONS

This application is based upon and claims the benefit of prior German Application No. 10 2013 207 536.7, filed on Apr. 25, 2013, the entire contents of which are incorporated herein by reference.

FIELD OF TECHNOLOGY

The disclosure relates to a cell block for a battery having one or more battery cells, and a method of assembling a cell block.

BACKGROUND

High-voltage batteries for motor vehicle applications, especially in motor vehicles with a hybrid or pure electric power system, are becoming more important. Such batteries typically have a plurality of battery cells, e.g., lithium-ion cells, which needs to be cooled in order to dissipate generated heat.

DE 10 2008 059 967 A1 describes a heat conducting plate arranged in a battery housing for controlling the temperature of the battery, whereby several electrically parallel and/or serially interconnected individual cells are connected with the heat-conduction plate in a heat-conductive manner. Here, the heat-conducting plate is made of a base plate provided with a circular molded edge, into which a cooling coil is inserted and sealed.

DE 10 2008 034 873 A1 also describes a battery having several single cells interconnected in series and/or in parallel and with a cooling element for cooling the individual cells. The cooling element is designed as a heat sink provided with notches into each of which, a single cell is at least partially arranged in longitudinal extension.

The setup described in the above-mentioned references requires that both terminals of the single cells be guided on one side, i.e., through the upper cell cover. This complicates the setup of the cells. In addition, each layer of juxtaposed individual cells requires a separate heat sink. Furthermore, accurate determination of physical features of the battery cells during battery operation, such as the temperature in the battery cells, is difficult in the above-described setup.

Moreover, further development with regard to safe and low-vibration fixation of the individual battery cells is desirable, especially in automotive applications, at least because the fixation determines the life and durability of the battery.

In the production of high-voltage batteries, the number of components that need to be combined in a predefined sequence is not insignificant, while safety aspects, such as "live-line working" or "working under high voltage" are allowed. Improving the reliability of installation therefore represents a further challenge in the design of batteries.

SUMMARY

One object of the disclosure is to solve at least one of the above-mentioned problems. In particular, one object of the disclosure is to indicate a cell block for a battery, as well as a procedure for assembling a cell block, with which the functional reliability and durability of the battery may be improved, in particular for automotive applications.

This object is achieved with a cell block and a method as disclosed herein.

A cell block consistent with embodiments of the disclosure includes one or more battery cells, which are provided in a housing made of, e.g., plastic. The battery cells may be cylindrical cells, e.g., circular-cylindrical cells, which are bundled and in some embodiments connected in parallel in the housing of the cell block. In some embodiments, nine battery cells are provided per cell block. Several cell blocks may be combined into cell block locks, whereby the individual cell blocks of a cell-block lock may be serially interconnected. When, for the sake of simplicity, describing (several) battery cells, this also includes the special case, where the cell block has only one single battery cell. Conversely, descriptions, which are made for the sake of simplicity on the basis only one battery cell, apply likewise to several or all battery cells. The cell block according to embodiments of the disclosure has a box-shaped housing, which is open on one side. The battery cells are inserted through the open side into the housing. Subsequently, the cell fixation is pushed through the open side into the housing, such that the battery cells become fixed in the housing, and the housing with the cell fixation is at least partially closed. The cell fixation may be a plate-shaped plastic component, which is forced and/or pressed into the housing by the application of pressure. The cell fixation has one or more bond openings, through which the battery cells may be accessed, after the cell fixation has been pushed in. In the case, where the battery cells are cylindrical formations, and an electrical terminal is provided on both bottom surfaces thereof, i.e., a negative and positive terminal of the relevant battery cell, the bond openings match the corresponding terminals (e.g., the positive terminals) of the battery cells after the cell fixation has been pushed in. Via the bond opening(s), an electrical connection between the corresponding terminal of the battery cell and a contact plate of a terminal-connection plate may be established in a subsequent step, which is described in more detail below. According to the disclosure, a projecting collar is provided, at least partially, around a bond opening on the side of the cell fixation facing away from the battery cells, such that the collar may be brought into contact with an end plate, e.g., the above-mentioned contact plate.

With the collar consistent with embodiments of the disclosure around one or more bond openings, flat placement of the end plate upon the cell fixation in the installed condition is avoided. Thus vibration strains may be diminished during the bonding step. In addition, the cell fixation consistent with embodiments of the disclosure enables vibration damping during battery use, e.g., in the vehicle-installed condition. Particularly for vehicle applications, in which vibrations and impacts need to be taken into account in the development of vehicle components, the present disclosure is especially suitable, as the bond connections between battery cells and the contact plates have excellent durability. Thus the reliability of the battery is on the whole improved. Besides vibration damping, the cell fixation consistent with embodiments of the disclosure allows for a more precise alignment of the battery cells in the housing. Due to the collar around the bond opening, the cell fixation provides specific mounting points for an end plate, thus ensuring a defined force distribution along the axis of the relevant battery cells. Moreover, due to the collar made of a soft material, tolerance compensation in the longitudinal direction of the battery cell is established. All occurring component tolerances are absorbed and a certain minimum compression of the battery cell is thus ensured.

In some embodiments, the end plate is a contact plate of a terminal-connection plate, as already mentioned above. In this case, the terminal-connection plate should be brought into conductive contact with a terminal of the battery cell, whereby the collar is in (mechanical) contact with the non-conductive contact plate. Between the contact plate and the relevant terminal of the battery cell, a bond should be established later, e.g., by means of wire bonding, soldering, etc. The cell fixation consistent with embodiments of the disclosure reduces the relative movements between the contact plate of the terminal-connection plate and the relevant battery cell terminal, thereby further improving operational reliability and durability of the battery.

In some embodiments, the contact plate has at least one opening, which matches a corresponding bond opening of the cell fixation, such that bonding of the contact plate with a corresponding battery cell terminal and the terminal-connection plate can be done in the installed condition of the cell fixation through the both openings. In this manner, the electrical connection between the contact plate and the battery cell may be done at the latest possible point in time, thereby improving the reliability of the battery installation. This advantage is especially important in high-voltage batteries, as in the production of such high-voltage batteries, the number of components that need to be combined in a predefined sequence is not insignificant, while safety aspects, such as "live-line working" or "working under high voltage" are allowed. As the electrical connection between the battery cells and the contact plates is established only upon completion of the installation of the battery, the risk of short-circuits, etc., occurring during the installation of the battery can be reduced.

In some embodiments, the housing of the cell block has a base opposite the open side, into which one or more cell-insertion openings are fitted, and into which the battery cells are pushed or pressed. In some embodiments, the battery cells have a flat negative terminal, whereby the battery cells with the flat negative terminal are pushed downward into the cell-insertion openings and into the base of the housing. The flat negative terminal is generally less susceptible to mechanical damages than is the usually dome-shaped and rounded positive terminal. As the battery cells are inserted with the same alignment, such as with the flat negative terminal facing downward, mechanical insertion of the cells may be done with a constant insertion depth and quality, thereby improving the quality and durability of the later contact between the relevant side of the battery cells and any terminal plate arranged at the bottom. In some embodiments, (improved) planar contact of the negative terminal of the battery cells may be established with the terminal plate between the battery cells (negative side) and the terminal plate applying a conductive adhesive, whereby even and durable heat dissipation via the terminal plate may be achieved. Between the terminal plate on the negative side of the battery cells and the cooling plate, a gap filler is inserted and if necessary glued in place.

In some embodiments, one or more cell-insertion openings have one or more ridges, which guide and hold the battery cells, as they are pushed and/or pressed in, such that the ridges become elastically or plastically deformed during insertion of the battery cells. The ridges referred to here are situated on the inner circumferential surface of the cell-insertion openings. The ridges provide defined guidance, i.e., exact alignment of the battery cells in the housing, as well as firm retention of the battery cells. Firm and defined alignment of the battery cells upon insertion into the base of the housing facilitates later placement and insertion of the cell fixation into an accurate position, especially alignment of the bond openings of the cell fixation relative to the corresponding terminals of the already inserted battery cells. When mechanically inserting the battery cells, a constant insertion depth and a constant quality of the subsequent contact between the negative side of the battery cells and the terminal plate is achieved. Also, the ridges on the inner circumferential surface of the cell-insertion opening in connection with the circular collar at the positive terminal on the cell fixation provide for tolerance compensation in the longitudinal direction of the battery cells.

In some embodiments, the battery cells on the side inserted through the cell-insertion opening are provided with a conductive adhesive, as indicated above, in order to provide a heat-conductive connection with the terminal-connection plate (contact plate). In connection with the gap filler, which is optionally situated between the terminal-connection plate (contact plate) and the cooling plate, a heat-conducting connection between the battery cell and the cooling plate is provided.

Besides the heat-conducting connection described above, the conductive adhesive or a so-called gap filler, situated between the terminal plate and the heat-conducting connection, contributes to a stable and low-vibration mounting of the cell blocks on the cooling plate.

The collar and the cell fixation, e.g., made of plastic, whereby the advantages explained above are achieved by very simple means. Moreover, the cell fixation may be designed as an injection-molding component.

However, the cell fixation and the collar may be made of different plastics, whereby the collar is of a softer plastic than is the cell fixation. This will improve the aforementioned advantages in terms of vibration absorption, alignment and fixation of the battery cells. Moreover, tolerance compensation takes place in the longitudinal direction of the cells.

In some embodiments, the cell fixation has at least one additional collar around a bond opening, which collar is provided on the side facing the battery cells. The additional collar(s) are thus in contact with the battery cell(s). This will ensure clean placement of the cell fixation on the battery cells on the battery cells, whereby the vibration absorption and defined alignment of the battery cells are enhanced in regards to the above-mentioned effects.

In some embodiments, the housing has an end stop limiting how far the cell fixation may be pushed in. Thus, the defined fixation and alignment of the battery cells is improved. This results in the advantage of a defined height of the installation space along the mechanically inserted battery cell being created. Moreover, the ensuing attachment of the end plate in an accurate position is simplified. For the same purpose, the cell fixation and/or the housing may have means for engaging the cell fixation in a certain position in the housing.

The object described above is moreover achieved by a method for equipping a cell block with one or more battery cells. Consistent with embodiments of the disclosure, one or more battery cells are initially inserted in the box-shaped housing, which is open on one side. The cell fixation is subsequently pressed through the open side into the housing, thereby fixing the battery cells in the housing and closing the housing at least partially, such that the cell fixation has one or more bond openings, through which, the battery cells may be accessed after insertion of the cell fixation, and such that a projecting collar is provided at least partially around a bond opening on the side of the cell fixation facing away from the battery cells, as described above.

In some embodiments of pressing the battery cells into the cell-insertion openings of the housing, as described above, the bottom side (e.g., the negative side) of the cell block is bonded after fitting the cell fixation. Then, the cell block is may be installed on a cooling plate, which also serves as carrier of one or more cell blocks. The cell blocks may be fastened with the cooling plate, e.g., with screws. Subsequently, i.e., after installation of the cell block on the cooling plate, the side of the battery cells facing away from the cooling plate (e.g., the positive side) is bonded with the corresponding contact plate. This will create a layer of cell blocks, which on one side, e.g., the negative side, are in contact with a cooling plate.

Additionally, a further layer may be provided in mirror-inverted fashion on the opposite side of the cooling plate, whereby space utilization is improved with optimized power output.

Although the disclosure is suitable for application in a vehicle, such as a hybrid vehicle or an electric vehicle, one of ordinary skill in the art would understand that the disclosure may also be implemented in other fields, e.g., transportation, such as aviation and navigation, building services, etc. Moreover, further advantages and features of the disclosure are explained in the following description of embodiments. The features described there may be converted separately or in combination with one or more of the features mentioned above, provided the features do not contradict themselves. The following description of the embodiments is done with reference to the accompanying drawings.

BRIEF DESCRIPTION OF THE DRAWINGS

FIGS. 9a and 9b show cell fixations before and after the installation.

FIGS. 11a to 11d show details of the cell fixation.

DESCRIPTION OF THE EMBODIMENTS

Figure 1:
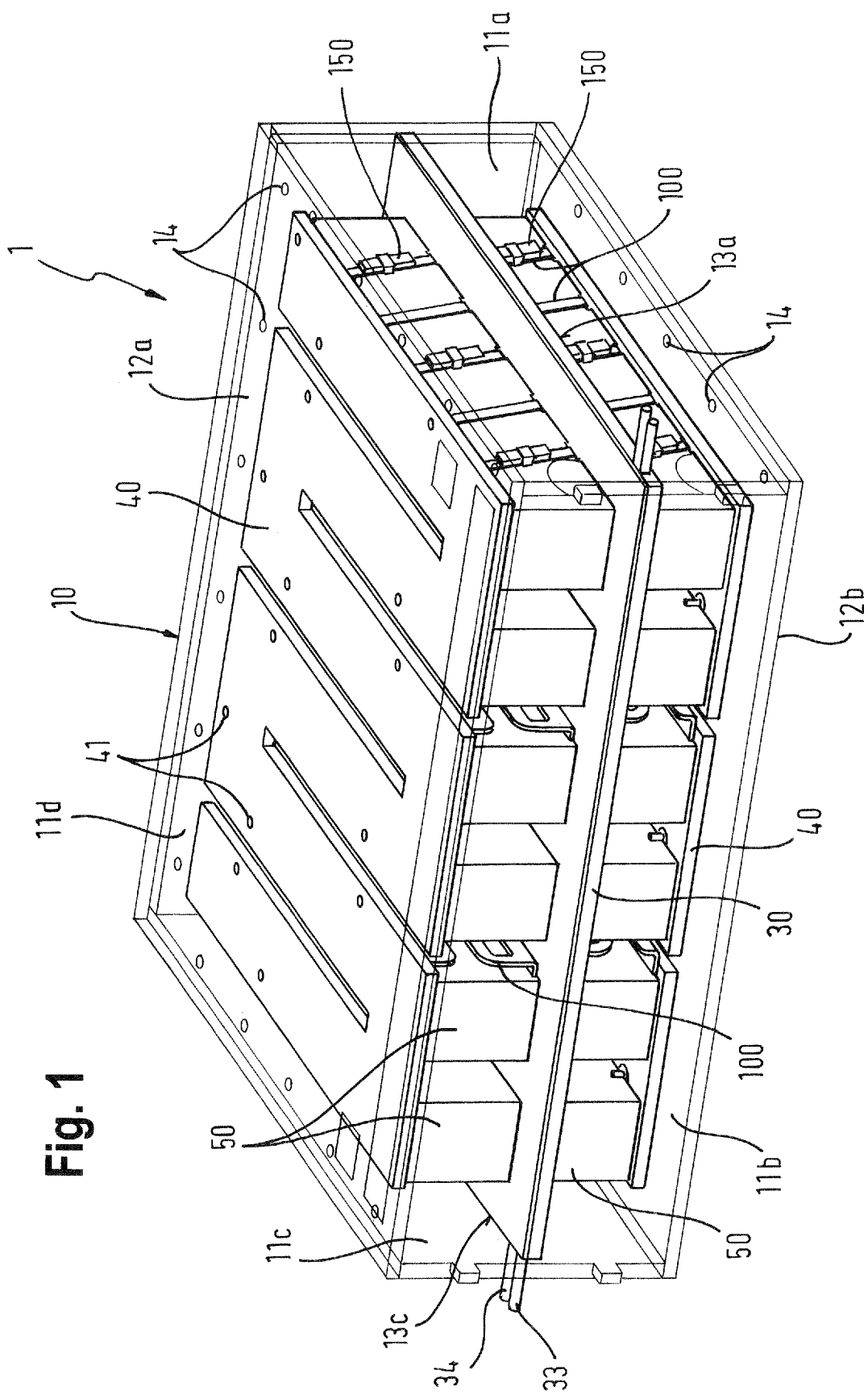
FIG. 1 is a perspective view of the overall structure of a battery.

FIG. 1 shows an overall structure of a battery 1. The battery 1 is enclosed by a battery housing 10, which is drawn in order to illustrate the inner structure of the battery 1.

The battery housing 10 has four plate-shaped side panels 11a-11d, as well as two cover plates 12a and 12b, which are connected with one another in order to a box-shaped housing. The lower cover plate 12b is also referred to as a base plate. The two side panels 11a and 11c each have an elongated recess 13a and 13c, in which a cooling plate 30 of the battery 1, described below, is inserted.

Figure 12A:
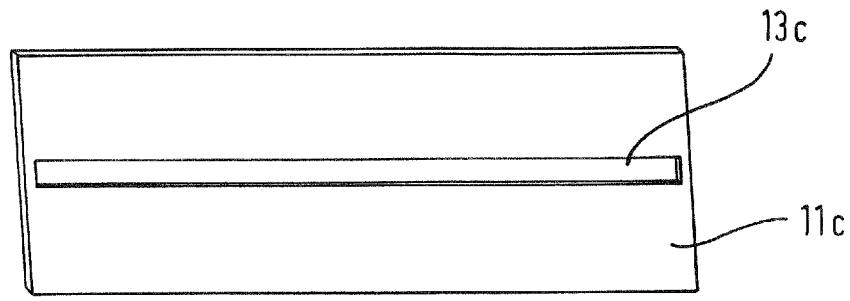
FIGS. 12a-12c show the structure of a self-supporting housing for the battery.
Figure 12B:
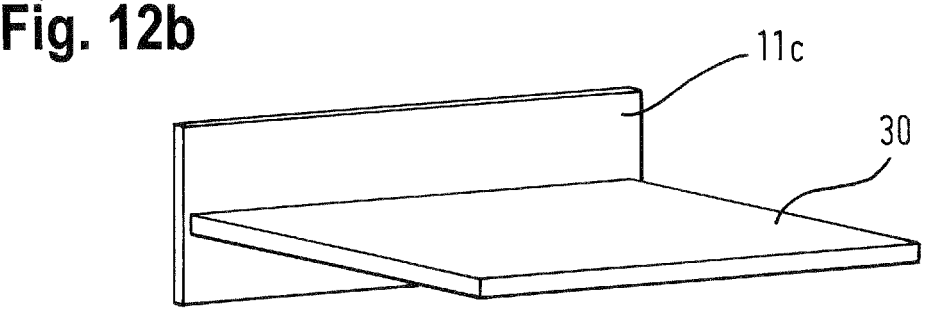
Figure 12C:
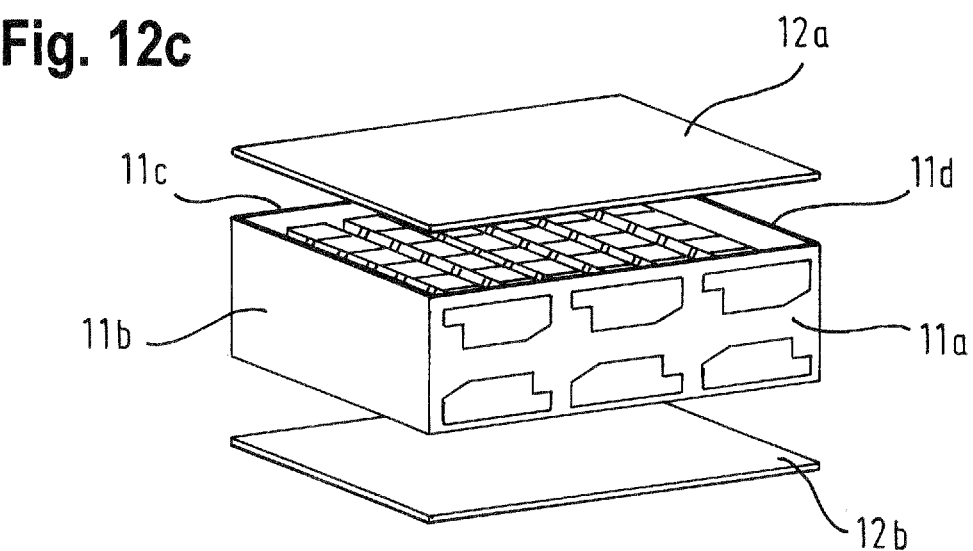

An exemplary design of the battery housing 10 is shown in FIGS. 12a-12c. FIG. 12a shows the recess 13c of side panel 11c, into which the cooling plate 30 of battery 1 is inserted and/or fitted, as shown in FIG. 12b. The cooling plate 30 and recesses 13a and 13c thus interact like a groove and spring. The recesses 13a and 13c may be milled, cut and impressed or fitted in some other ways into the side panels 11a and 11c.

The side panels 11a to 11d along with fitted cooling plate 30, which optionally support further battery components, are fastened to one another with screws or in some other manner, such that the battery 1 is held exclusively by the interconnected side panels 11a-11d. The cover plates 12a and 12b stabilize, but do not contribute to the retention of the actual battery, so in this sense, the housing is self-supporting. All four side panels 11a-11d thus carry the whole battery without installed cover plate 12a and base plate 12b. In this manner, battery pre-wiring may be done from either side on the pre-installed housings, which, however, are accessible from above and below. Maintenance work on the battery levels may be done as needed from above or below, without having to remove the whole system from its installation space.

In the housing 10, openings 14 are provided, which serve as degassing openings in the case of degassing. In some embodiments, the openings are provided on the cover plate 12a and/or the base plate 12b. When certain batteries are overloaded, compensation reactions may occur, resulting in, e.g., decomposition of water and formation of detonating gas. The openings 14 degas defective battery cells, not shown in FIG. 1, thus enhance battery safety.

Furthermore, openings are provided in the housing 10 for cooling lines 31 and 32 of cooling plate 30. In addition, connecting and/or positioning devices may be provided in or on the battery housing 10 in order to allow modular connection of several batteries shown in FIG. 1 (e.g., stacking) and/or mounting of battery 1 in a vehicle. Battery 1, shown here, is operational and ready for use as a separate component, and is also combinable with one or more batteries in a modular fashion.

FIG. 1 shows elongated cell-block locks 50 that include several adjacent cell blocks 60, which in turn contain several battery cells 70. The cell blocks 60 comprising the battery cells 70 are not shown in FIG. 1. Adjacent cell-block locks 50 are electrically interconnected with the terminal-connection plates 100. The right-hand side of FIG. 1 shows further terminal-connection plates 100 of a different type, which electrically interconnect adjacent cell blocks 60. In the structure of FIG. 1, every other terminal-connecting plate 100, which interconnect adjacent cell blocks 60, 150, carries a sensor.

While the cell-block locks 50 are arranged on top and below in mirror-inverted fashion on the cooling plate 30, an end plate 40 closes the cell-block locks 50 on the side opposite the cooling plate 30. The end plates 40 also have openings 41, which in the case of a battery-cell defect serve as degassing openings.

Figure 2:
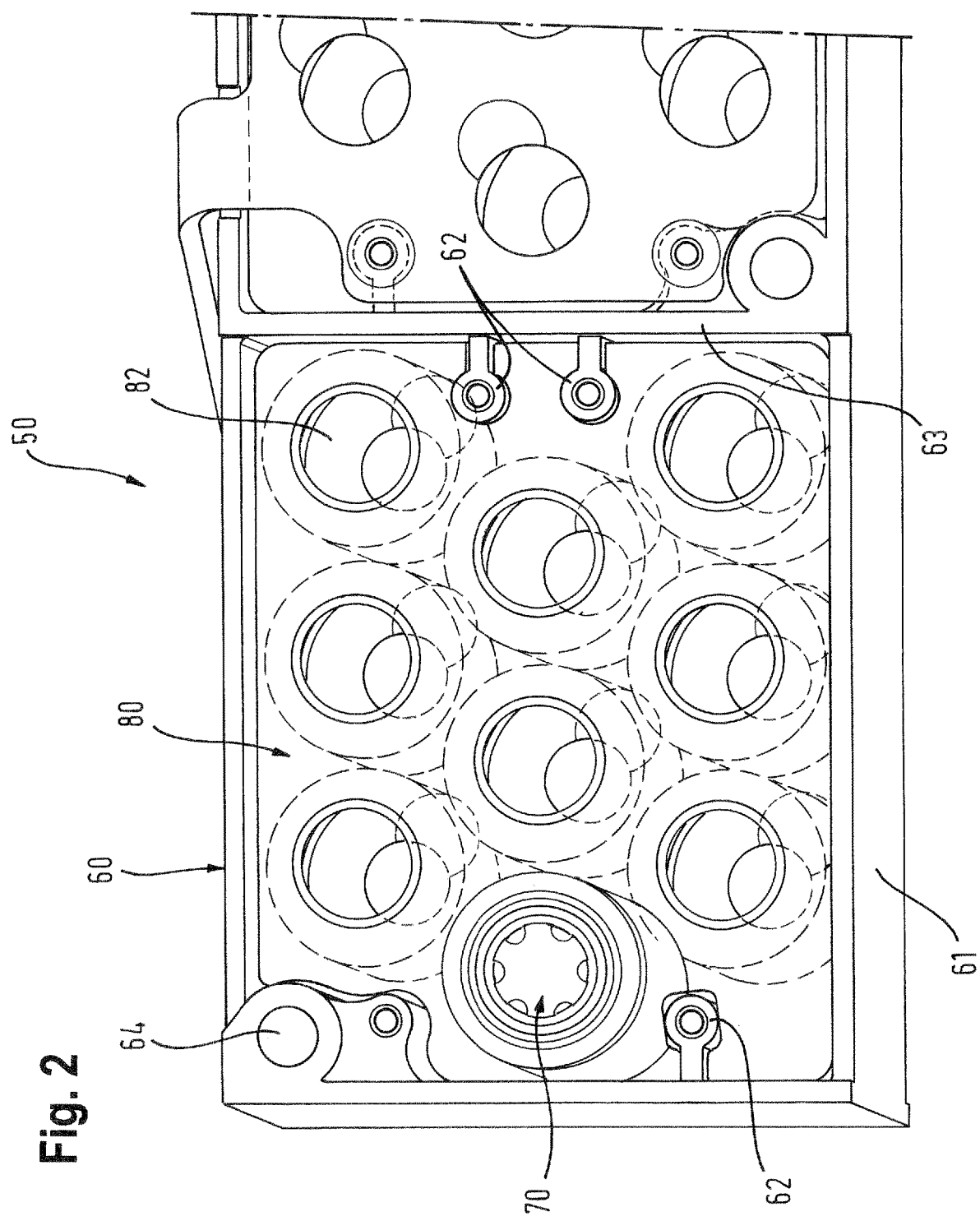
FIG. 2 is an oblique top view of a cell block of the battery.

FIG. 2 represents a cutout of a cell-block lock 50 having several cell blocks 60. In housing 61 of the cell block 60, a cell fixation 80 is present, which fixes several battery cells 70 from above. In the present housing, nine battery cells 70 are provided per cell block 60. The battery cells 70 may have a diameter of approximately 20 mm and a length of approximately 65 mm. Thus, by equipping nine battery cells 70 per cell block 60, a cell-block dimension of, e.g., 70 mm×70 mm×55 mm or so is obtained. These parameters are, of course, only meant as examples, although they ensure an excellent volume/performance ratio and/or weight/performance ratio, when applied in an electric or hybrid vehicle. The structure of the cell fixation 80 is described in more detail further below. On the housing 61, end stops 62 are provided for positioning and, optionally, fixation of the cell fixations 80 on the cell-block lock 50. Several cell blocks 60 are provided for each cell-block lock 50. The individual cell blocks 60 are separated from one another by partition walls 63 of the housing 61. In the housing 61, further elements may be provided, e.g., fastening elements 64 for fastening the end plate 40 in the battery housing 10.

Figure 3:
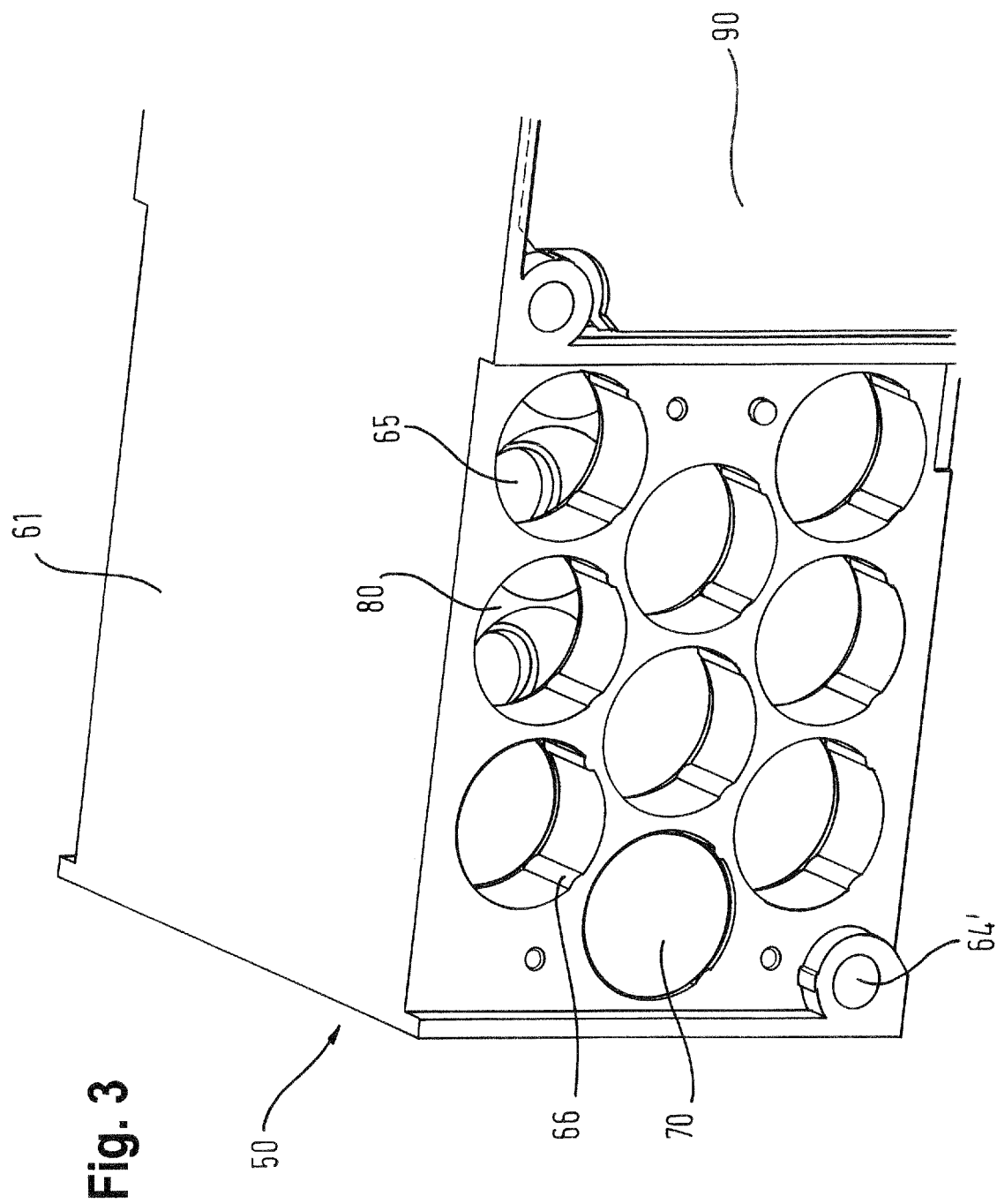
FIG. 3 shows a cell block of the battery obliquely from below.

An oblique bottom view of the cutout of a cell-block lock 50 is shown in FIG. 3. The housing 61 has a bottom surface, in which the cell-insertion openings 65 are fitted. The battery cells 70 are pushed and/or pressed into the cell-insertion openings 65. Moreover, ridges 66 may be provided in the cell-insertion openings 65 for better retention, which ridges may become either elastically or plastically deformed, when inserting the battery cells 70, thereby providing firm retention of the battery cells 70 at the bottom of the housing 61. When mechanically inserting the battery cells, a constant insertion depth and a constant quality of the subsequent contact between the negative side of the battery cells and the terminal plate are achieved. Also, the ridges on the inner circumferential surface of the cell-insertion opening in connection with the circular collar at the positive terminal on the cell fixation provide for tolerance compensation in the longitudinal direction of the battery cells. Fixation means 64', e.g., for screwing the housing 61 together with the cooling plate 30, are provided.

Figure 5:
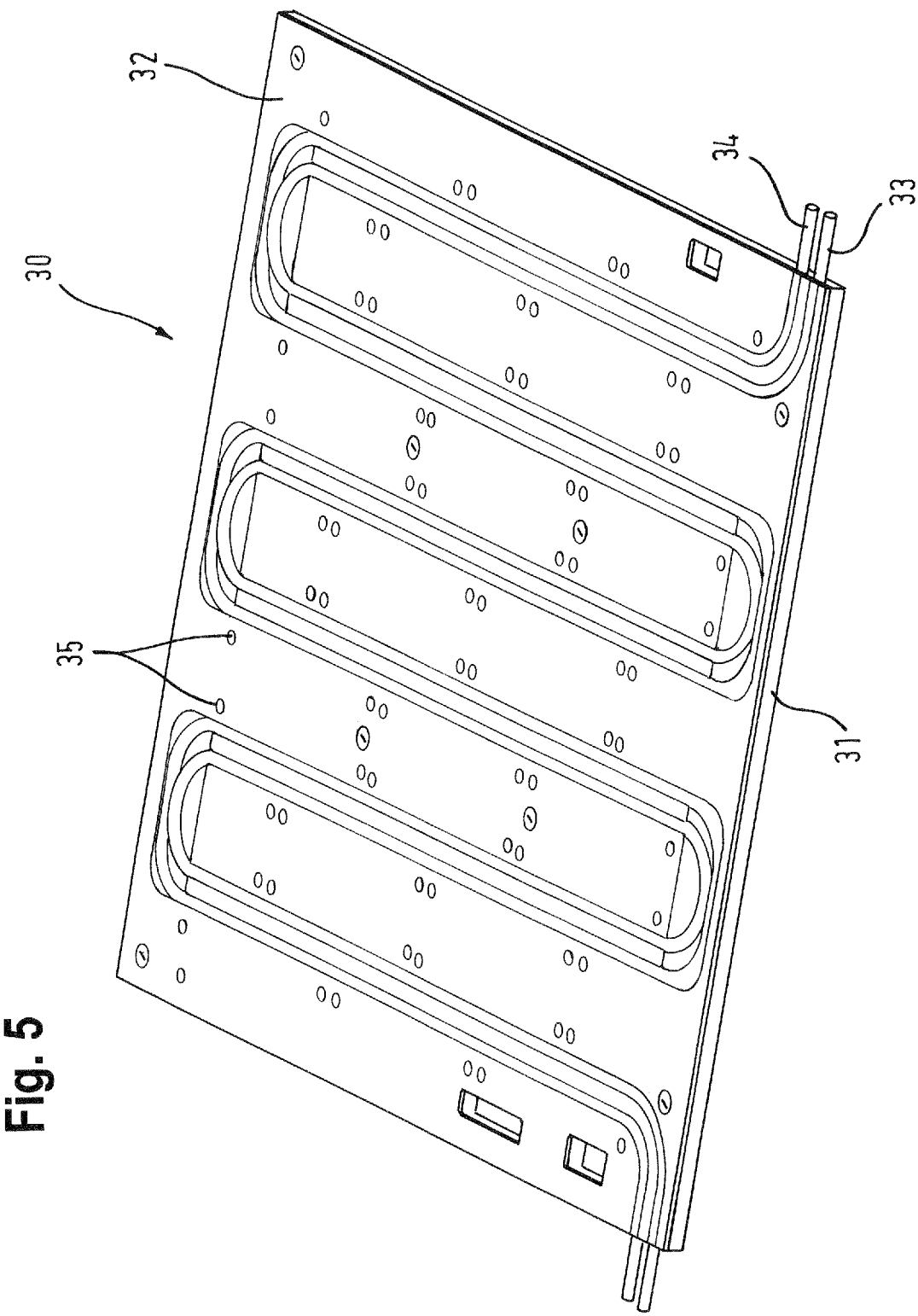
FIG. 5 shows a cooling plate for use in the battery.

A more detailed view of the cooling plate 30 is shown in FIG. 5. The cooling plate 30 has a baseplate 31 and a cover 32, which are fastened to one another, e.g., screwed, stuck, clipped and/or glued together. In some embodiments, the cooling plate 30 is about 8-10 mm thick. Tubes 33 and 34 are inserted into the baseplate 31 of the cooling plate 30 in recesses appropriately provided for this purpose. For a more uniform cooling efficiency, the two cooling tubes 33 and 34 work according to the countercurrent principle, i.e., the coolant contained therein, e.g., glycol, flows in opposite direction in the two pipes 33 and 34. Thus, any cooling gradient due to an increase in the temperature of the coolant from entry into the cooling plate 30 until exit from the cooling plate 30 is minimized. The baseplate 31 and the cover 32 are made of, e.g., aluminum and screwed together. The cooling plate 30 has openings 35 for fastening the cell-block locks 50 on the cooling plate 30. In this regard, the cooling plate 30 also serves as a carrier of battery components. The cell-block locks 50 are fastened on the cooling plate 30 with their lower surface, i.e., the surface shown in FIG. 3. In some embodiments, the battery cells 70 are aligned, such that the flat negative terminal is in contact with the cooling plate 30 in a heat-conductive manner, optionally by a conductive adhesive and/or gap filler, described in more detail below. Thus, the cooled surface of the battery cells 70 can be maximized. Also, the flat negative side of battery cell 70 is generally less sensitive than is the rounded positive side, which simplifies the assembly, in which the battery cells 70 are aligned as shown here.

Figure 7A:
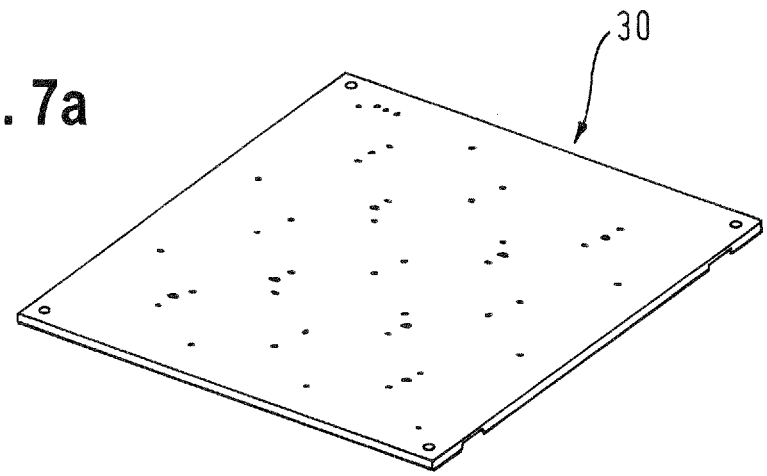
FIG. 7a shows a cooling plate design.
Figure 7B:
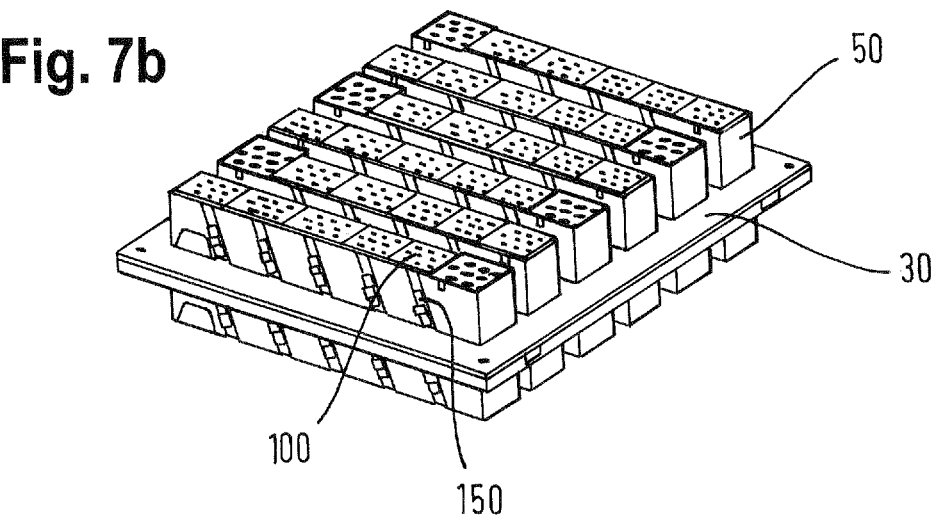
FIG. 7b shows cell-block levels that are arranged mirrored to one another.
Figure 7C:
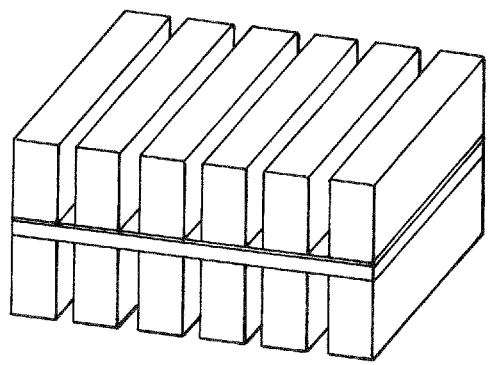
FIG. 7c shows a thermal simulation of the structure in the FIG. 7b.

FIG. 7a schematically shows a cooling plate 30, which, as shown in FIG. 7b, is equipped with cell-block locks 50. Furthermore, FIG. 7b shows the terminal-connection plates 100, described further below, being equipped with sensors 150. A simulated temperature distribution for the two levels of the cell-block locks 50, which share a single cooling plate 30 above and below, respectively, is shown in FIG. 7c.

Figure 4:
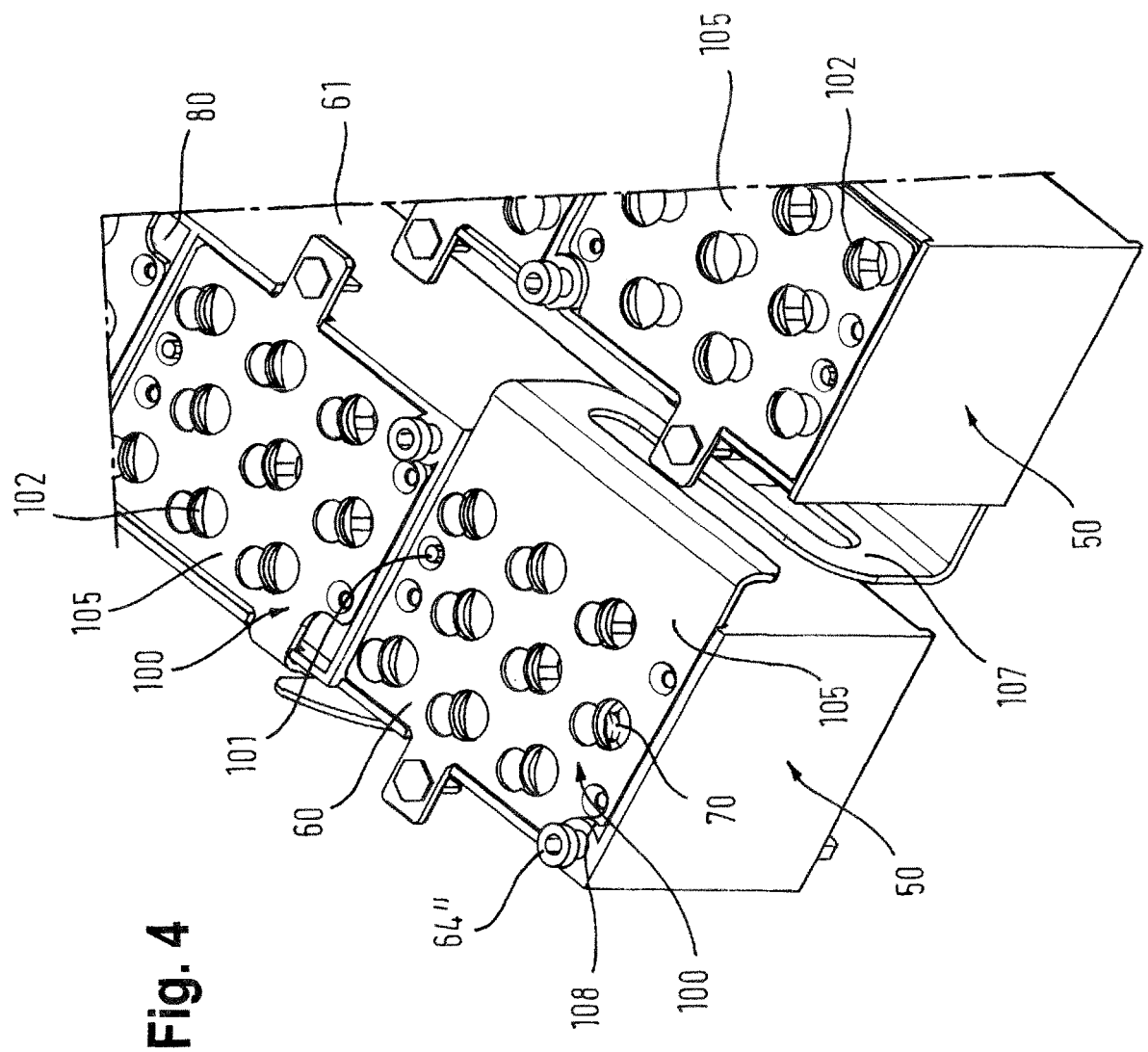
FIG. 4 shows the connection of two cell-block locks by means of a terminal-connection plate.

FIG. 4 shows a cutout of two cell-block locks 50, seen obliquely from above. The structure shown in FIG. 4 roughly matches that in FIG. 2, in which cell fixations 80 are provided on the terminal-connection plates 100. FIG. 4 shows two types of terminal-connection plates 100, i.e., those that connect two adjacent cell blocks 60 with one another, and those that connect two adjacent cell-block locks 50 with one another. The terminal-connection plates 100 are connected via the fixation means 101 with the cell blocks 60. The terminal-connection plates 100 may be, e.g., screwed, inserted, glued, welded together or fastened in some other way. The terminal-connection plates 100 have contact plates 105 and 106, which are provided parallel to one other, as shown more clearly in FIG. 6a. The contact plates 105 and 106 have openings 102, which make it possible to access battery cells 70. Furthermore, in the installed condition, the positions of the openings 102 of the upper contact plate 105 match the positions of the openings 82 of the cell fixations 80. An electrical connection between the terminal-connection plates 100 and the battery cells 70 may be made via the openings 102 in the contact plates 105 and 106 in the pre-installed condition of the terminal-connection plates 100, e.g., by means of wire bonding. Rear bonding by means of a bonding wire 103 is shown in FIG. 8b. Moreover, defective electrical connections between contact plates 105, 106 and battery cell 70 may be restored in a simple manner because of the openings 102, without removing the pole-connecting plate 100. Bonding in the pre-installed condition enhances safety during installation in case of any short-circuits or other electrical defects. Moreover, the openings 102 may serve as degassing openings in case of a defective battery cell. In order to simplify the installation of a cell-block lock 50 on the cooling plate or for fastening an end plate 40, one or more edges of the contact plates 105 and 106 may be beveled or notched, as shown in FIG. 4. Here, a concave notch in an edge of the upper contact plate 105 is useful for adjusting the fixation means 64 with a screw 64".

The two contact plates 105 and 106 of the terminal-connection plate 100 are electrically conductive and connected conductively with one or more battery cells 70 of a cell block 60. The two contact plates 105 and 106 are interconnected via a connecting bridge 107. In the present embodiment, the contact plates 105 and 106 and the connecting bridge 107 form an integral piece. The terminal-connection plate 100 is produced, e.g., by punching out a basic form from a metal sheet and subsequently bending the contact plates 105 and 106. The rear contact plates 106 are not shown in FIG. 4.

Figure 6A:
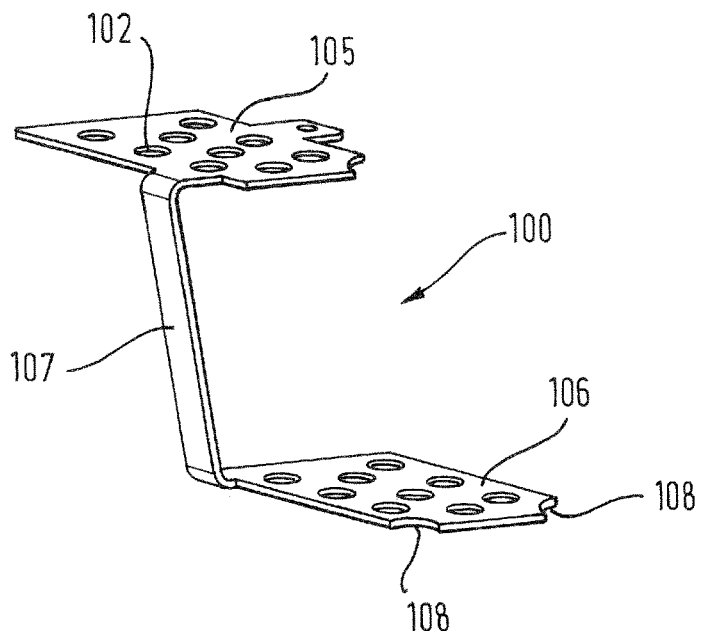
FIGS. 6a-6c show a terminal-connection plate individually and in connection with a cell-block lock.

A detailed drawing of the terminal-connection plate 100 is shown in FIG. 6a. The two contact plates 105 and 106 are arranged parallel to one another and interconnected by connecting bridge 107, whereby they appear offset to one another in plan view. In this manner, the adjacent battery cells 70 are electrically interconnected. In this regard, the diagonally connected contact plates 105 and 106 enable a serial connection of the cell blocks 60, when the battery cells 70 are directly aligned in terms of polarity. The uniform alignment of the battery cells 70 enables optimal cooling, as all battery cells 70 with the flat negative terminal may be brought into contact with the cooling plate 30. Furthermore, the uniform alignment of the battery cells 70 allows for simplified production, as the assembly of the individual cell blocks 60 and cell-block lock 50 may be done mechanically and with the less sensitive negative terminal facing down.

Figure 6B:
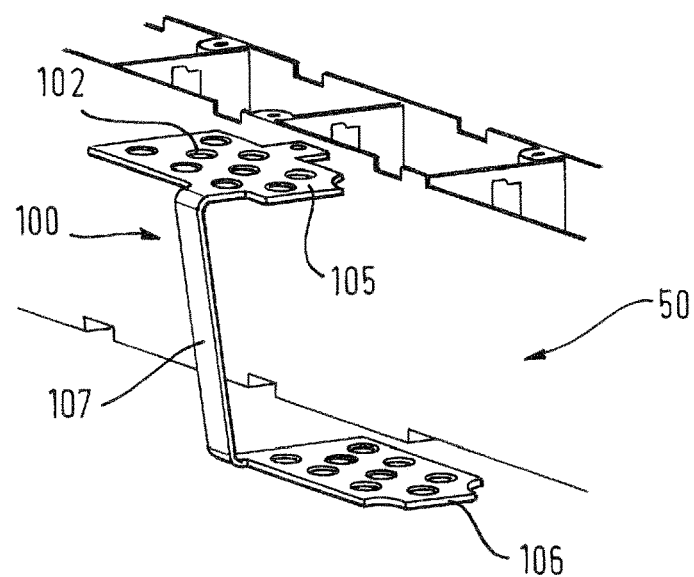
Figure 6C:
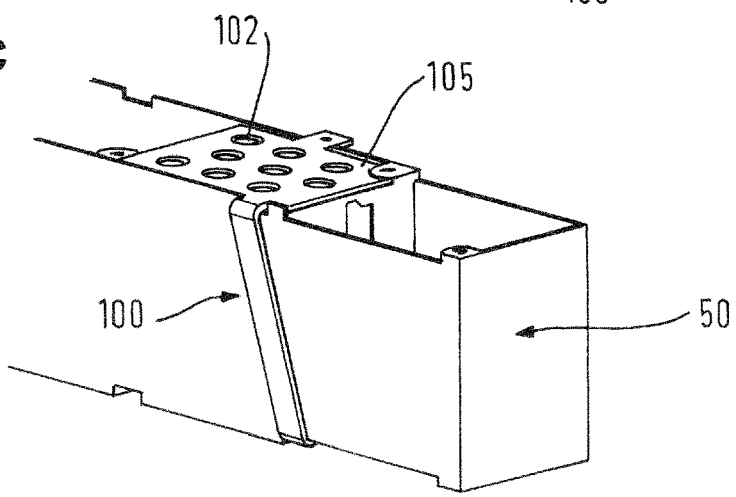

The mounting of the terminal-connection plate 100 on the cell-block lock 50 is shown in FIGS. 6*b* and 6*c*. The upper contact plates 105 rest substantially flatly on the corresponding cell fixation 80 of a cell block 60. The connecting bridge 107 extends along an outside wall of the cell-block lock 50, without substantially increasing the need for space. The contact plates 106 are in electrical contact below with the negative terminals of the battery cells 70. Moreover, the contact plates 105 and 106 are bent in the same direction relative to the connecting bridge 107, such that the lateral profile of the terminal connection plate is U-shaped. In the case of a terminal-connection plate 100, which interconnects adjacent cell-block plates 50, the contact plates 105 and 106 are bent in opposite directions, as shown in FIG. 4.

Figure 6D:
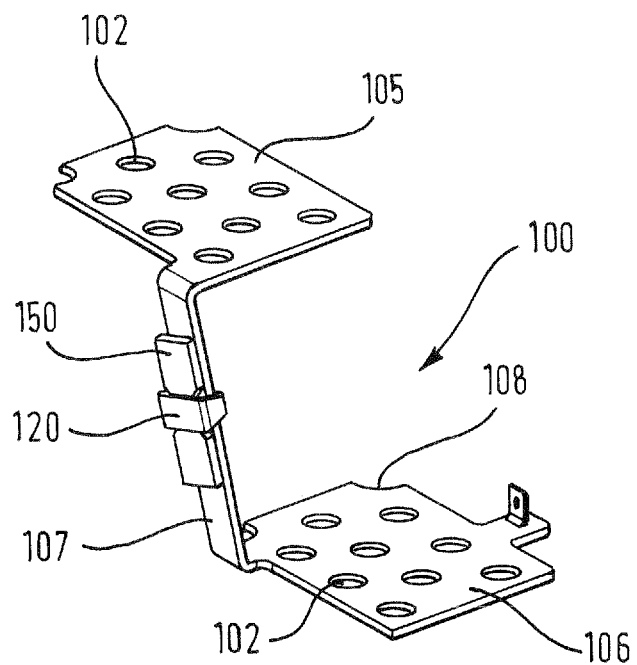
FIG. 6d shows a terminal-connection plate with a sensor attached to it.
Figure 6E:
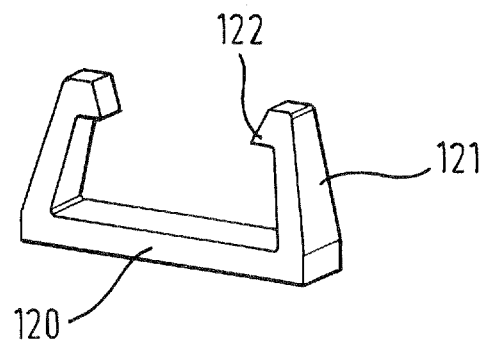
FIG. 6e shows a sensor attachment device, which is implemented as clip.
Figure 6F:
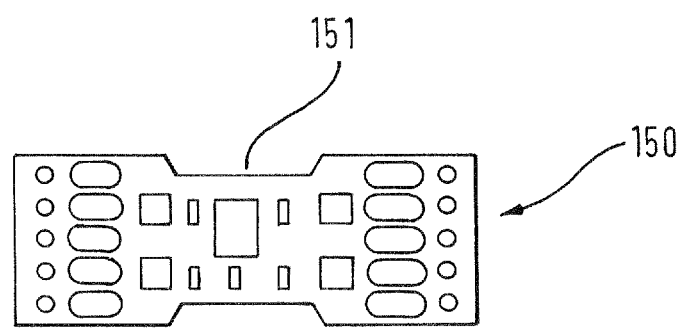
FIG. 6f shows a sensor.

As is shown in FIG. 6*d*, a sensor-mounting device 120 is provided on the connecting bridge 107 of the terminal-connection plate 100, which is equipped with a sensor 150. The sensor-mounting device 120 is a clip, which is shown as enlarged and in perspective view in FIG. 6*e*. The clip 120 is a U-shaped plastic part, whose upper open ends 121 are both provided with a hook-shaped projection 122. The clip 120 grips the sensor 150 mid-way, as shown in FIG. 6*f*. Moreover, the sensor 150 has notches 151, into which both clip arms 121 engage. In the present case, the sensor 150 is an integrated electronic component with a circuit board, a temperature sensor and electronic components, as indicated schematically in FIG. 6*f*. The clip 120 grips sensor 150 and the connecting bridge 107, and because of the elasticity of the plastic of which the clip 120 is made, clings tight with its projections 122 behind the connecting bridge 107. In some embodiments, the connecting bridge 107 of the terminal-connection plate 100 has one or more impressions, such that slipping of the clip 120 along the connecting bridge 107 is prevented.

Figure 8A:
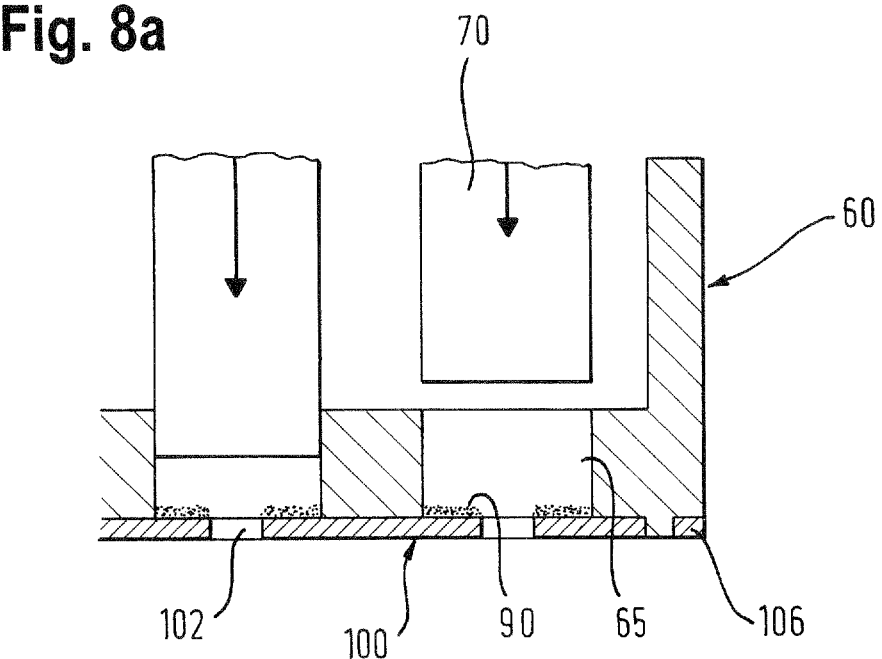
FIGS. 8a and 8b show the introduction of battery cells into a cell housing and bonding of the battery cells on the bottom of the cell housing in order to create a cell block.
Figure 8B:
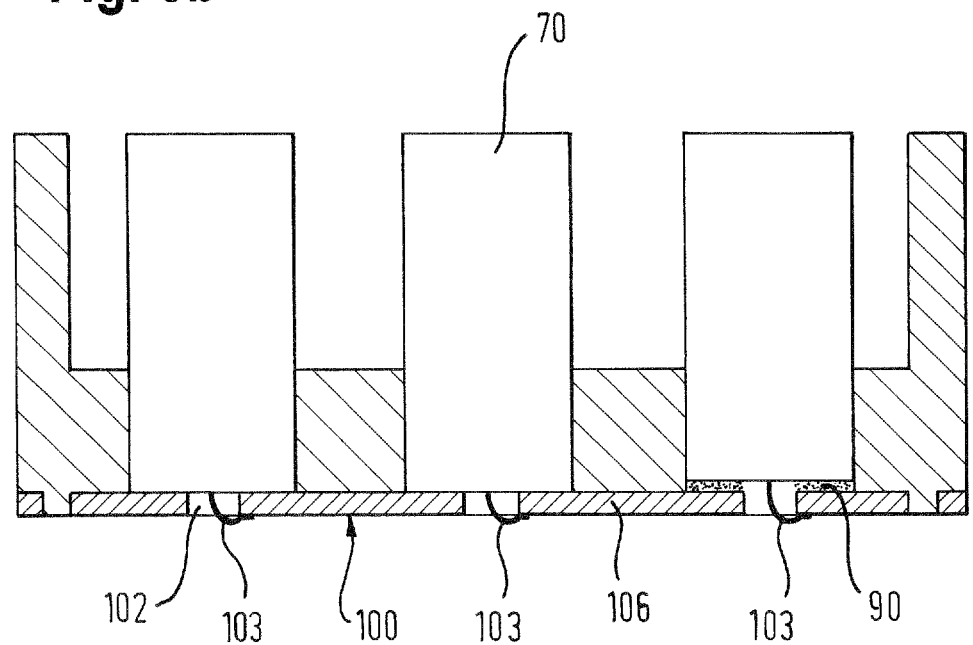

FIGS. 8*a* and 8*b* show the insertion procedure of the battery cells 70 in the base of the housing 61 of a cell block 60. In some embodiments, insertion is performed mechanically. The bottom of the housing 61 has several openings 65 (in the present embodiment, nine per cell block 60). The battery cells 70 are pressed in from above into the openings 65. Before this process, a conductive adhesive 90 was placed on the terminal-connection plate 100 or the battery cell 70. In FIG. 8*b*, the conductive adhesive 90 is shown only below battery cell 70 on the external right-hand side in order to illustrate how the battery cells 70 are pressed onto the terminal-connection plates 100. FIG. 8*b* shows bonding wires 103, which connect the terminal-connection plate 100 with the flat negative terminal of battery cell 70. Following the procedure of insertion into the housing 61, planar contact is ensured due to the gluing with the conductive adhesive 90. Due to the conductive adhesive compound, excellent heat dissipation occurs via the terminal-connection plate 100, in contrast to the situation, in which the conductive adhesive 90 is not used. Due to the mechanical insertion of the battery cells 70, optionally with the interaction of the ridges 66 of FIG. 3, the quality of the contact between the cathode side of the battery cells 70 and the terminal-connection plate 100 remains constant.

In the following, fixation of the battery cells 70 into a precise position with the aid of the above-mentioned cell fixations 80 is described. FIGS. 9*a* and 9*b* represent a cell-block lock 50 seen obliquely from above. FIG. 9*a* shows the cell fixation 80 before installation, while FIG. 9*b* shows the situation after installation. The substantially rectangular cell fixations 80 are pushed into the housing 61 of cell block 60. The insertion depth of the cell fixations 80 may optionally be predefined by an end stop not shown in FIGS. 9*a* and 9*b*. Additionally, locking in the end position may be provided. By locking the cell fixation 80 in the housings 61, optionally with the aid of latches, a defined installation space height along the mechanically inserted battery cells 70 is created. Furthermore, due to the internal geometry of the cell fixations 80, tolerance compensation is made possible along the longitudinal axis of the battery cells 70. The cell fixation 80 may be implemented as a 2K part (soft and rigid component).

Figure 11A:
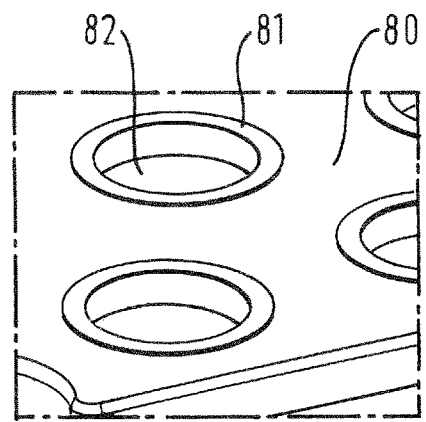
Figure 11B:
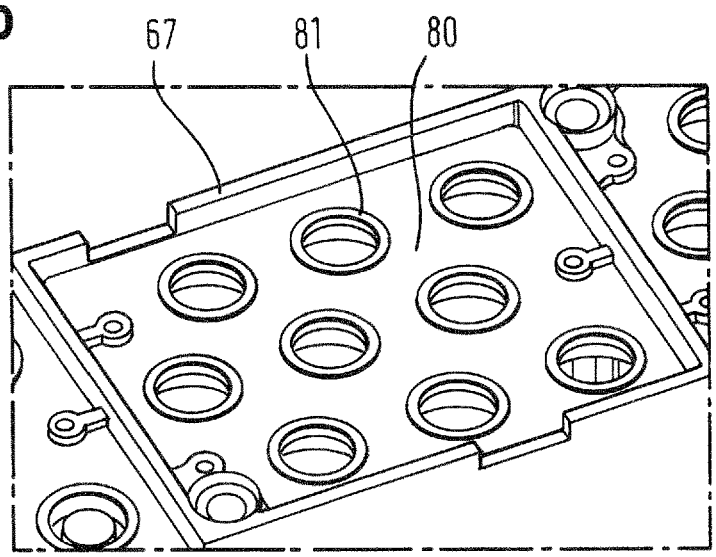
Figure 11C:
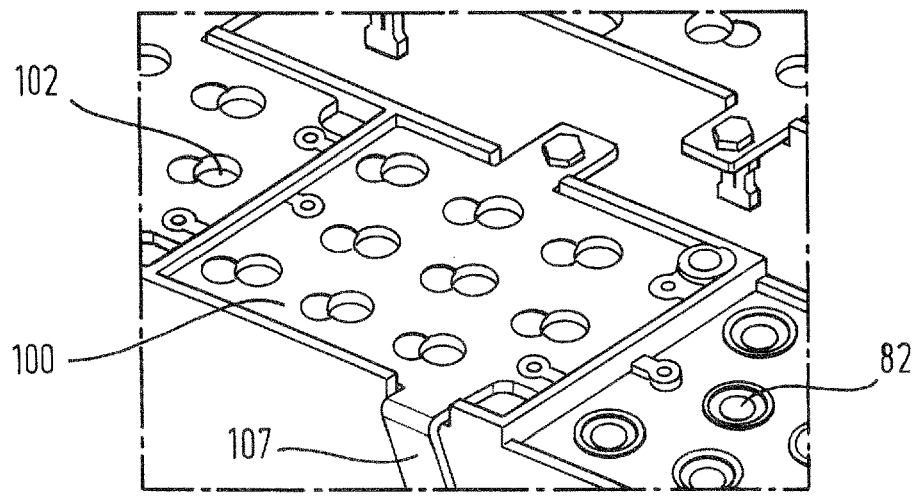

FIGS. 11*a* to 11*c* represent detail views of the cell fixation 80. The cell fixations 80 have openings 82, which fix the battery cells 70 and allow for access to the battery cells 70 after pre-installation of the cell fixations 80 and contact plates 105. As the openings 82 are provided primarily for electrical contacting of the contact plates 105 with the positive terminals of battery cells 70, they are likewise referred to as bond openings 82. A circular collar 81 is provided around the openings 82. Due to the circular collar 81, completely flat mounting of the terminal-connection plates 100 over the whole corresponding surface of the cell fixation 80 will not occur, whereby in the installed condition improved damping of vibrations is enabled, which, among other things, contributes to a more durable bond between the battery cells 70 and contact plates 105. The cell fixation 80 may be implemented as a 2K part for improved vibration damping and/or tolerance compensation.

A schematic sectional view of the layer structure is shown in FIG. 11*d*. There, the battery cell 70 of the cell fixation 80 is fixed from above. The upper contact plate 105 of the terminal-connection plate 100 is placed on the cell fixation 80. Below, the battery cell 70 rests upon on the lower contact plate 106 of the terminal-connection plate 100, optionally with the aid of a conductive adhesive 90, not shown in FIG. 11*d*. The collar 81 around the bond opening 82 is shown in FIG. 11*d*. Moreover, a collar 83 may be provided on the lower side of the bond opening 82, ensuring clean mounting on battery cell 70. The battery cell 70 may optionally have corresponding projections and/or collars in order to provide secure fixation and mounting. The depicted collars 81 and 83 allow for improved distribution of force around the opening, along the cell axis. While the cell fixation 80 may be made of a hard 2K-injection molding part, the collar 81 and/or 83 may be made of a soft plastic component, thereby improving the tolerance compensation along the cell axis.

Figure 10:
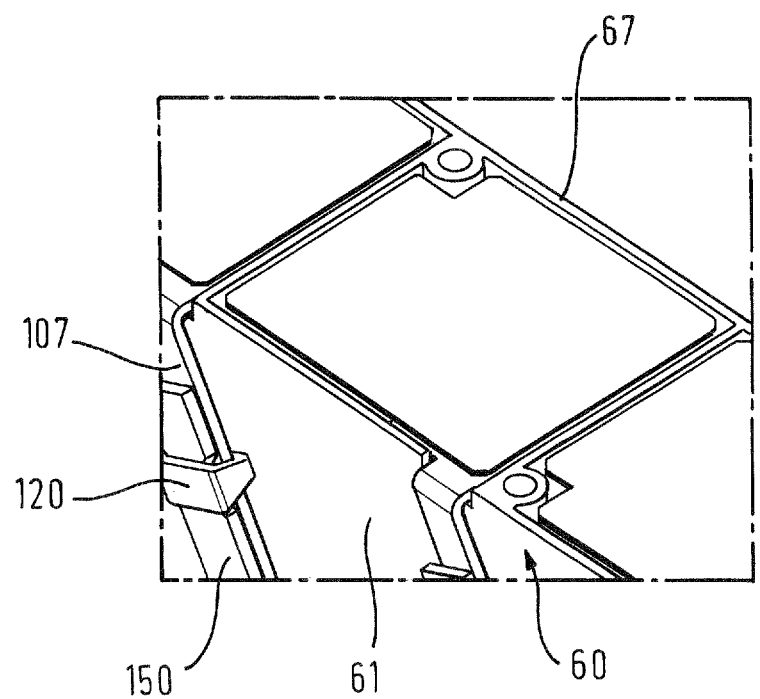
FIG. 10 is an oblique bottom view of a closed cell block, in which a collar for galvanic separation of the terminal-connection plates from the cooling plate appears.

In FIGS. 9*b*, 11*b*, 10 and others, a circular non-continuous collar 67 of the housing 61 of the cell block 70 is shown. Uneven compression and thus damage to the underlying bond connections are prevented by this circular collar 67, which ensures a defined distance from the cooling plate 30, when the cell-block lock 50 is screwed on. For galvanic isolation or for improved heat transfer between terminal-connection plate 100 and cooling plate 30, a so-called gap filler 91 is employed. The gap filler 91 is indicated in FIG.

11d. The gap-filler material is inserted as a common part between each terminal-connection plate 100 and the cooling plate 30.

In the production of the depicted high-voltage battery, the number of individual components that need to be combined in a predefined sequence is not insignificant, while safety aspects, such as "live-line working" or "working under high voltage" are allowed. In this regard, the depicted battery structure makes safe installation possible. A exemplary installation sequence is as follows:

1. Assembling the cell blocks 60 of a cell-block lock 50 with battery cells 70.
2. Fastening the terminal-connection plates 100 with screws.
3. Bonding the slot on the negative terminal.
4. Installing all cell-block locks 50 of a battery level with the cathode side on the cooling plate 30.
5. Bonding the pre-installed completed battery level on the positive side.

In some embodiments, the above sequence may be performed on the uncovered bottom side of the cooling plate 30 in order to mount a second battery level.

The technical solutions for assembling and producing a high voltage battery, in particular assembling the cell-block locks 50, which may be done mechanically, make it possible to utilize this method, including for large-scale production. Cathodes bonded on the cathode side are installed on the cooling plate 30, such as immediately after the bonding, in order to protect the bonding sites, such that the risk of damage during transport, etc., is minimized. "Short-circuiting" of the prebonded cell-block lock 50 is avoided, as the serial connection remains interrupted (positive side not yet bonded, at this time) during installation on the cold plate 30, thereby enhancing installation safety.

More Description of the Battery Housing 10 and the Battery Installation

The battery housing 10 has four plate-shaped side panels 11a-11d, and two cover plates 12a, 12b. All six housing components 11a-11d, 12a, 12b are combinable or were combined with one another to form a box-shaped housing. At least two opposite side panels 11a, 11c each have an elongated recess 13a, 13c, into which a functional battery plate, e.g., a cooling plate 30, is insertable or was inserted. In some embodiments, each side panel 11a-11d has a notch, into which the functional plate is inserted or has been inserted. The functional battery plate thus contributes to the stabilization of the battery housing 10, even when the battery housing 10 is not completely closed. Moreover, the side panels 11a-11d are optionally interconnected with the aid of the functional plate, such that they support the whole battery without installed cover plates. All four side panels 11a-11d support the whole battery without installed cover plates; in this sense, the battery housing 10 is self-supporting.

The battery housing 10 allows for installation and/or maintenance work on the battery, which is accessible from the top and/or bottom. Removing the whole system from its installation space is therefore not required. In particular, wiring of the battery, when installed in the battery housing 10, is possible, whereby safety is substantially enhanced, especially for the application of a high-voltage battery for vehicles. The advantages achieved with the disclosure explained above may be achieved by a simple structure of the battery housing 10, which is desirable in terms of productivity.

In some embodiments, the four side panels 11a-11d are interconnected, whereby a battery cooling plate 30 is inserted into the recesses 13a, 13c as a functional plate. In such embodiments, the battery cooling plate 30 is used to dissipate heat from the battery, as well as serving as a stabilizing "housing" component, whereby a synergetic effect is achieved in this regard.

In some embodiments, two independent cooling circuits are provided in the cooling plate 30, which operate according to the countercurrent principle, thereby obtaining a more homogeneous temperature distribution in the battery 1. In some embodiments, the heat dissipation through the cooling plate 30 occurs on the cathode side of the battery 1.

In some embodiments, two cooling tubes 33, 34 are introduced into the cooling plate 30, and extend substantially parallel to one another. In order to realize the above-mentioned counter-current principle in a simple manner, the cooling loops include the two cooling tubes 33, 34 extending in parallel, and in some embodiments close to one another or immediately side by side. A temperature gradient exists in one of the cooling tubes 33, 34 from entry into the cooling plate 30 until exit from the cooling plate 30. Such an uneven heat-emission distribution may be compensated, at least partially, by the other one of the cooling tubes 33, 34 extending in parallel, and a coolant flowing in the opposite direction.

In some embodiments, the cooling plate 30 has a baseplate 31 and a cover 32, which are connected to one another, in some embodiments fastened by screws, whereby one or more recesses are fitted into the baseplate 31 in order to receive one or more of the cooling tubes 33, 34, and into which, the cooling tubes 33, 34 are inserted. Thus, a stable cooling plate 30 with protected cooling circuits is created, such that it is particularly suitable as a stabilizing housing element.

In some embodiments, the side panels 11a-11d of the battery housing 10 may be or were already screwed together in order to enable easy installation and removal of the battery housing 10 with sufficient stability.

In some embodiments, the battery housing 10 has one or more gas discharge openings. Openings may be present in order to discharge any gases in a targeted manner. Ideally, in this case, hoses would be attached on the outside of these opening for gas discharge. When a battery cell 70 becomes defective, these gas discharge openings serve as ventilation openings. When certain batteries are overloaded, compensation reactions may occur, resulting in, e.g., decomposition of water and formation of detonating gas. One or more openings for the degassing of defective battery cells 70 thus increase battery safety. The gas discharge openings may include the openings 14, or may include other openings when the openings 14 are used for fastening attachments (e.g., a control module unit) by screws.

In some embodiments, a control module unit for controlling the battery 1 is mounted outside on the battery housing 10, and in some embodiments on one or more side panels 11a-11d. Wiring of the battery 1 with an external and/or externally fitted control unit may thus be accomplished in a simple way with a partially opened battery housing 10.

With a general procedure for installing a battery, a battery housing 10 is provided, as explained above, in addition to a battery 1 having a functional plate. Subsequently, the battery 1 and the battery housing 10 are assembled, such that the battery 1 is supported by the side panels 11a-11d of the battery housing 10, whereby the functional plate is inserted into the recesses of the side panels 11a, 11c. Following this, the battery housing 10 is closed by mounting one or both cover plates 12a, 12b.

Installation work may be done on the battery 1 with a partially open battery housing 10, i.e., on one or both opened cover plates 12*a*, 12*b*. This allows safety to be substantially enhanced during installation, as described above. In the production of high-voltage batteries, the number of components that need to be combined in a predefined sequence is not insignificant, while safety aspects, such as "live-line working" or "working under high voltage" are allowed. Both the battery housing 10 and the installation procedure were developed with this in mind, and are applicable for industrialization, including large-scale production.

Part of the battery installation work may involve equipping the cooling plate 30 with one or more battery blocks 60 having battery cells 70. Due to the self-supporting battery housing 10, assembling the cooling plate 30 may be done with a partially opened battery housing 10, which simplifies combining the battery 1 with the battery housing 10.

In some embodiments, one or more cell blocks 60 are equipped with battery cells 70. Subsequently, cell fixations 80 are pushed/pressed in. In some embodiments, contact plates 105, 106 of terminal-connection plates 100 are subsequently mounted, e.g., fastened with screws, on the positive and negative sides of the battery cells 70. Following this, bonding of the negative side of the battery cells 70 with the corresponding contact plate 106 is done. Bonding may be done by wire bonding, soldering, etc. At any rate, due to bonding, an electrical connection between the negative poles of the battery cells 70 and the corresponding contact plate 160 is established. Subsequently, the cell blocks 60 bonded on the negative side in this manner are equipped with gap filler 91 and then fastened to the cooling plate 30 with screws. Next, the positive sides of the battery cells 70 are bonded with the corresponding contact plates 105. Then, the cooling plate 30 equipped on both sides with the cell-block locks 50 with the supporting lateral housing plates is installed.

An advantage of the disclosure is that the cooling plate 30 may be equipped on both sides with cell blocks 60, thereby improving space utilization and optimizing output yield.

More Descriptions of the Cell Blocks 60 and the Method of Assembling the Cell Blocks 60

The cell block 60 has one or more battery cells 70, which are provided in a housing 61, which may be made of plastic. In some embodiments, the battery cells 70 are cylindrical cells, e.g., circular-cylindrical cells, which are bundled and may be connected in parallel in the housing 61 of cell block 60. In some embodiments, nine battery cells 70 are provided per cell block 60. Several cell blocks 60 may be combined into cell-block locks 50, whereby the individual cell blocks 60 of a cell-block lock 50 are, e.g., serially interconnected. When, for the sake of simplicity, describing (several) battery cells 70, this also includes the special case, in which the cell block 60 has only one single battery cell 70. Descriptions made on the basis of one battery cell 70 apply likewise to several or all battery cells 70. The cell block 60 has a box-shaped housing 61, which is open on one side. The battery cells 70 are inserted through the open side into the housing 61. Subsequently, the cell fixation 80 is pushed through the open side into the housing 61, such that the battery cells 70 are fixed in housing 61, and housing 61 with the cell fixation 80 at least partially closed. The cell fixation 80 may be a plate-shaped plastic component, which is pressed and/or pushed into housing 61 by the application of pressure. The cell fixation 80 has one or more bond openings 82, through which the battery cells 70 may be accessed, after the cell fixation 80 has been pushed in. In the housing, where the battery cells 70 are cylindrical formations, on whose both bottom surfaces, an electrical terminal is provided, i.e., the negative and positive terminal of the relevant battery cell 70, the bond openings 82 match the corresponding terminals (e.g., the positive terminals) of the battery cells 70 after the cell fixation 80 has been pushed in. Via the bond opening(s) 82, an electrical connection between the corresponding terminal of battery cell 70 and a contact plate 105 of a terminal-connection plate 100 may be established in a subsequent step, which is described in more detail below. A projecting collar 81 is provided, at least partially, around a bond opening 82 on the side of the cell fixation 80 facing away from the battery cells 70, such that the collar 81 may be brought into contact with an end plate, e.g., the contact plate 105 mentioned above.

With the collar 81 around one or more bond openings 82, (completely) flat placement of the end plate upon the whole cell fixation 80 is avoided in the installed condition. Thus vibration strains may be reduced during the bonding step. In addition, cell fixation 80 enables vibration damping during battery use, e.g., in the vehicle-installed condition. Particularly in vehicle applications, in which vibrations and impacts need to be taken into account in the development of vehicle components, the present arrangement is especially suitable, as the bond connections between battery cells 70 and the contact plates 105, 106 have excellent durability. Thus, the reliability of the battery is on the whole improved. Besides vibration damping, the cell fixation 80 allows for a more precise alignment of the battery cells 70 in the housing 61. Due to the collar 81 around the bond opening 82, the cell fixation 80 provides specific mounting points for an end plate, thus ensuring a defined distribution of force along the axis of the relevant battery cells 70.

In some embodiments, the end plate is a contact plate 105 of a terminal-connection plate 100, as already mentioned above. In this case, the terminal-connection plate 100 should be brought into conductive contact with battery cell 70, whereby the collar 81 is in (mechanical) contact with the non-conductive contact plate 105. Between the contact plate 105 and the relevant terminal of the battery cell 70, a bond connection should be established later, e.g., by means of wire bonding, soldering, etc. The cell fixation 80 reduces the relative movements between the contact plate 105 of the terminal-connection plate 100 and the relevant battery cell 70 terminal, thereby further improving operational reliability and durability of the battery.

In some embodiments, the contact plate 105 has at least one opening 102, which matches a corresponding bond opening 82 of the cell fixation 80, such that bonding of the contact plate 105 with a corresponding battery cell 70 terminal can be done in the installed condition of the cell fixation 80 and the terminal-connection plate 100 through the two openings 102, 82. In this manner, the electrical connection between the contact plate 105 and the battery cell 70 may be done at the latest possible moment, thereby improving battery installation reliability. This advantage is especially useful in high-voltage batteries, as in the production of such high-voltage batteries, the number of components that need to be combined in a predefined sequence is not insignificant, while safety aspects, such as "live-line working" or "working under high voltage" are allowed. As the electrical connection between the battery cells 70 and the contact plates 105 is established only upon completed battery installation, the risk of short-circuits, etc., occurring during the installation of the battery can be reduced.

In some embodiments, the housing 61 of the cell block 60 has a base opposite the open side, into which one or more cell-insertion openings 65 are fitted, and into which the battery cells 70 are pushed or pressed. In some embodiments, the battery cells 70 have a flat negative terminal, whereby the battery cells 70 with the flat negative terminal are pushed downward into the cell-insertion openings 65 and into the base of housing 61. The flat negative terminal is generally less susceptible to mechanical damages than is the usually dome-shaped and rounded positive terminal. As the battery cells 70, each having the same alignment, such as with the flat negative terminal facing downward, are pushed in, mechanical insertion of the cells 70 may be done with a constant insertion depth and quality, thereby improving the quality and durability of the later contact between the relevant side of the battery cells 70 and any terminal plate arranged at the bottom.

In some embodiments, one or more cell-insertion openings 65 have one or more ridges, which guide and hold the battery cells 70, as they are pushed or pressed in, such that the ridges become elastically or plastically deformed during insertion of the battery cells 70. The ridges referred to here are situated on the inner circumferential surface of the cell-insertion openings 65. The ridges provide defined guidance, i.e., exact alignment of the battery cells 70 in the housing 61, as well as firm retention of the battery cells. Firm and defined alignment of the battery cells 70 upon insertion into the base of housing 61 facilitates later placement and insertion of the cell fixation 80 into an accurate position, especially alignment of the bond openings 82 of the cell fixation 80 relative to the corresponding terminals of the already inserted battery cells 70.

The so-called gap filler, besides the heat-conducting connection described above, contributes to a stable and low-vibration mounting of the cell blocks 60 on the cooling plate 30.

In some embodiments, the collar 81 and cell fixation 80 are provided as an integral component, e.g., made of plastic, whereby the advantages explained above are achieved by very simple means. Moreover, the cell fixation 80 may be formed as an injection-molding part.

In some embodiments, the cell fixation 80 and the collar 81 may be made of different plastics, i.e., collar 81 is of a softer plastic than is cell fixation 80. This will improve the aforementioned advantages in terms of vibration absorption, alignment and fixation of the battery cells 70.

In some embodiments, the cell fixation 80 has at least one additional collar 83 around a bond opening 82, which collar is provided on the side facing the battery cells 70. The additional collar(s) 83 are thus in contact with the battery cell(s) 70. This will ensure a clean placement of the cell fixation 80 on the battery cells 70, as with regard to the above-mentioned effects, the vibration absorption and defined alignment of the battery cells 70 are enhanced.

In some embodiments the housing 61 has an end stop limiting how far the cell fixation 80 may be pushed in. This will improved the defined fixation and alignment of the battery cells 70. What's more, the ensuing attachment of the end plate in an accurate position is simplified. For the same reason, the cell fixation 80 and/or the housing 61 may have means for engaging the cell fixation 80 at a certain position in the housing 61.

In accordance with a method for assembling the cell block 60, one or more battery cells 70 are initially inserted into the box-shaped housing 61, which is open on one side. Next, the cell fixation 80 is pushed through the open side into the housing 61, such that the battery cells 70 become fixed in the housing 61 and the housing 61 at least partially closed, whereby the cell fixation 80 has one or more bond openings 82, through which the battery cells 70 may be accessed after insertion of the cell fixation 80, and whereby a projecting collar 81 is provided at least partially around a bond opening 82 on the side facing away from the battery cells 70 of the cell fixation 80, as described above.

In some embodiments, when the battery cells 70 are pushed into the cell-insertion openings 65 of the housing 61, as described above, initially the bottom side (e.g., the negative side) of the cell-block locks 50 is bonded after introduction of the cell fixation 80. Following this, the cell block 50 is installed on a cooling plate 30, which also serves as a carrier of one or more cell block locks 50. The cell block locks 50 may be fastened to the cooling plate 30, e.g., with screws. Subsequently, i.e., after installation of the cell block locks 50 on the cooling plate 30, the side of the battery cells 70 facing away from the cooling plate 30 (e.g., the positive side) is bonded with the corresponding contact plate 105. In this manner, a layer of cell blocks 60 is created, which on one side, e.g., the negative side, is in contact with a cooling plate 30.

Summary of an exemplary assembly procedure:

1. Press the battery cells 70 into the cell-insertion openings 65 of the housing (cell block 60 and cell-block lock 50).
2. Provide the cell-block lock 50 with cell fixations (push in).
3. Install the terminal-connection plates 100 for the whole cell-block lock 50;
4. Bond the whole negative side of the cell-block lock 50.
5. Apply gap filler 91 on the negative side of the cell-block lock 50;
6. Fasten cell-block locks 50 on cooling plate with screws.
7. After installation of all the cell-block locks 50 (already bonded on the negative side) on the cooling plate 30, bond the positive side of all cell block locks 50.
8. Install the lateral housing plates on the cooling plate 30.

Additionally, a further layer may be provided in mirror-inverted fashion on the opposite side of the cooling plate 30, thus improving space utilization with optimized power output.

More Descriptions of the Terminal-Connection Plate 100

The terminal-connection plate 100 has two conductive contact plates 105, 106, each of which may be brought into contact with one or more battery cells 70. In some embodiments, several battery cells 70 are assembled to form a block and electrically connected in parallel via a contact plate 105 of a terminal-connection plate 100 on one side and a contact plate 106 of another terminal-connection plate 100 on the other. In this case, the terminal-connection plate 100 thus connects two cell blocks 60, each of which are composed of several battery cells 70. In some embodiments, the terminal-connection plate 100 connects two cell blocks 60 in a row. In addition, a contact plate 106 is brought into electrical contact with the negative terminal of a cell block 60 and the other contact plate 105 is brought into electrical contact with the positive terminal of a second cell block 60. In a special case, a cell block 60 has only one single battery cell 70, whereby the terminal-connection plate 100 interconnects only two battery cells 70. When referring to a cell block 60 in the following, this includes the special case of a cell block 60 having only one battery cell 70. Both contact plates 105 and 106 of the terminal-connection plate 100 are conductively interconnected via a connecting bridge 107. On the connecting bridge 107 of the terminal-connection plate 100, a sensor-mounting device 120 is provided for a sensor 150, which is provided for measuring a physical characteristic of the battery, e.g., the temperature, in the vicinity of a cell block 60.

As the terminal-connection plate 100 with a sensor-mounting device 120 for a sensor 150 is provided, the functions of establishing electric conduction between the cell blocks 60 and performing battery measurements may be combined synergetically with one another. In this regard, the overall structure of a battery having several cell blocks 60 is simplified. Moreover, the sensor is situated in direct proximity to the cell blocks 60, whereby the accuracy of the measurements performed with the sensor may be improved.

In some embodiments, the terminal-connection plate 100 connects two adjacent cell blocks 60, whereby the sensor-mounting device 120 for the sensor 150 is provided roughly in the center between the two adjacent cell blocks 60. In this case, one sensor for two cell blocks 60 is sufficient, whereby the number of required sensors may optionally be reduced by half.

In some embodiments, the connecting bridge 107 has one or more impressions, such that the sensor-mounting device 120 may be secured on the connecting bridge 107, whereby especially slipping of the sensor-attachment device 120 along the connecting bridge 107 is prevented in a simple way.

In some embodiments, a sensor is fastened via the sensor-attachment device 120 on the terminal-connection plate 100. As the terminal-connection plate 100 is already equipped with a sensor, battery installation may be simplified.

In some embodiments, the sensor 150 is a temperature sensor. Generally, temperature changes occur in batteries. The life and discharge of the battery may depend on the temperature. For example, with conventional lithium-ion batteries, the probability of battery failure increases with increasing temperature. The cycle lifetime does not depend solely on the type and quality of the battery, or the type of battery usage, etc., but also on the temperature. Some batteries need to be used at room temperature, as low temperatures during operation may likewise be harmful. As a temperature sensor 150 is fastened directly on the connecting bridge 107 via a sensor-attachment device 120, the temperature in the direct vicinity of the battery cells 70 may be measured, thereby improving measuring accuracy.

In some embodiments, the two contact plates 105, 106 of the terminal-connection plate 100 are arranged parallel to one another, whereby they are connected by the connecting bridge 107, such that they are arranged offset from one another on the contact plates 105, 106, in plan view. In this way, adjacent cell blocks 60 are interconnected in a space-saving fashion. Here, the offset of the contact plates 105, 106 may be such that they do not overlap in plan view. If the cell blocks 60 are designed as a cluster of upright cylindrical battery cells 70, diagonal connection of adjacent cell blocks 60 from top to bottom occurs to a certain extent. A sensor, which is arranged roughly at the center of the connecting bridge 107, is thus situated roughly in the center between two adjacent cell blocks 60, whereby a sensor is responsible for two cell blocks 60.

In some embodiments, at least one of the two contact plates 105, 106 have at least one opening 102, through which, access to the battery cells 70 in the installed or pre-installed condition is possible. Access to the battery cell(s) 70 after installation of the terminal-connection plate 100 is useful in particular, when the electrical connection between the terminal-connection plate 100 and the corresponding terminal of the battery cell 70 is done via a so-called bond. Bonding may be done, e.g., by means of thin wires (wire bonds), soldering, or in some other way. Subsequent restoral of defective electrical connections between the contact plate 105, 106 and battery cell 70 may also be accomplished in a simple way due to the openings 102, without removal of the terminal-connecting plate 100. Bonding in the pre-installed condition enhances safety during installation against any short-circuits, etc. Moreover, the openings 102 serve as degassing openings 102 in the case of a defective battery cell 70. When certain batteries are overloaded, compensation reactions may occur, resulting in, e.g., the decomposition of water and the formation of detonating gas. One or more openings for the degassing of defective battery cells therefore enhance battery safety. If the contact plate 105, 106 is in direct (mechanical and electrical) connection with a terminal of a battery cell 70, then one or more openings 102 may improve even contacting.

If the contact plate 105, 106 for cell blocks 60 is provided with several battery cells 70, then the contact plate 105, 106 may have several openings 102 of the type described above.

In order to simplify the installation of the contact plate 105, 106 on a battery block, one or more edges of the rectangular contact plate 105, 106 may be beveled or notched. Via the bevels or notches, the contact plate 105, 106 may be fastened with screws or stuck in, e.g., using retention structures for the cell block 60. Obviously, openings in the contact plate 105, 106 may also be provided for this purpose. The contact plate 105, 106 may alternatively or additionally have notches, lugs, projections and/or other structures, which serve as attachment devices for the contact plate 105, 106 in the battery, or as attachment devices for other components on the terminal-connection plate 100.

In some embodiments, both contact plates 105, 106 and the connecting bridge 107 of the terminal-connection plate 100 are formed as integral components. The terminal-connection plate 100 may be made by punching out a basic form from a sheet metal, and subsequently bending the contact plate 105, 106.

In some embodiments, the sensor-attachment device 120 described above is a clip. The clip is made of a material, which has a certain elasticity, so that it may be clipped to the connecting bridge 107 of the terminal-connection plate 100.

In some embodiments, the clip 120 is a U-shaped part, whose upper open ends 121 are both provided with a hook-shaped projection 122. The sensor 150 may be introduced completely or partially into the U-shaped cutout of the clip, whereupon the whole clip-and-sensor assembly is slid over the connecting bridge 107, such that the projections of the clip on the side of the connecting bridge 107 facing away from the sensor engage with the connecting bridge 107. The sensor 150 thus becomes securely fastened on the terminal-connection plate 100. Moreover, interaction with any impressions on the connecting bridge 107 effectively prevents slipping of the sensor along the connecting bridge 107.

In some embodiments, the sensor-mounting device 120 consists of plastic, whereby the required strength of the connection is achieved by adding only a small amount of weight, which is especially desirable in electric-vehicle applications. The weight of the vehicle, including the battery, is a crucial parameter, which determines power consumption and thus the range of the vehicle.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cell block for a battery having a first terminal and a second terminal, comprising:
    a box-shaped housing including:
        an open side, and
        a base opposite the open side, the base including a cell-insertion opening;

a battery cell contained in the housing and received through the cell-insertion opening;

a cell fixation inserted in the housing near the open side of the housing, the cell fixation being configured to fix the battery cell in the housing, and the cell fixation including a bond opening aligning with the battery cell, the bond opening being configured to allow the battery cell to be accessed through the bond opening;

a first projecting collar provided on a side of the cell fixation, projecting away from the battery cell and at least partially surrounding the bond opening;

a second projecting collar provided on a side of the cell fixation, projecting towards the battery cell and at least partially surrounding the bond opening; and a terminal connection plate having a first end plate electrically coupled to the first terminal and in contact with the first projecting collar, a second end plate in contact with a second terminal of an adjacent cell block, and a bridge connecting the first end plate to the second end plate.

2. The cell block according to claim 1, wherein:
the first end plate includes a contact-plate opening that matches the bond opening, and
the cell block further comprises a bonding wire arranged through the bond opening and the contact-plate opening, and electrically coupling the first end plate with the first terminal.

3. The cell block according to claim 1, wherein the housing includes the base opposite the open side, the base including the cell-insertion opening aligning with the battery cell.

4. The cell block according to claim 3, wherein the cell-insertion opening includes a ridge configured to guide and hold the battery cell.

5. The cell block according to claim 4, further comprising:
a conductive adhesive provided between the second end plate and one side of the battery cell that is held by the cell-insertion opening, for a heat-conducting connection.

6. The cell block according to claim 1, wherein the cell fixation is provided as an integral part with the first projecting collar and/or the second projecting collar.

7. The cell block according to claim 6, wherein the integral part is made of plastic.

8. The cell block according to claim 1, wherein:
the first projecting collar and/or the second projecting collar is made of a first plastic,
the cell fixation is made of a second plastic, and
the first plastic is softer than the second plastic.

9. The cell block according to claim 1, wherein the second projecting collar is in contact with the battery cell.

10. The cell block according to claim 1, wherein the housing includes an end stop, configured to limit a distance into the housing the cell fixation is inserted.

11. The cell block according to claim 1, wherein at least one of the cell fixation or the housing includes a component configured to engage the cell fixation at a certain position in the housing.

12. A method for equipping a cell block for a battery having a first terminal and a second terminal with a battery cell, the cell block comprising:
a box-shaped housing including:
an open side, and
a base opposite the open side, the base including a cell-insertion opening;
a cell fixation configured to be inserted in the housing near the open side of the housing, the cell fixation being configured to fix the battery cell in the housing, and the cell fixation including a bond opening, the bond opening being configured to allow the battery cell to be accessed through the bond opening;
a first projecting collar provided on a side of the cell fixation, projecting away from the battery cell and at least partially surrounding the bond opening;
a second projecting collar provided on a side of the cell fixation, projecting towards the battery cell and at least partially surrounding the bond opening; and
a first terminal connection plate having a first end plate configured to be electrically coupled to the first terminal and in contact with the first projecting collar, a second end plate configured to be in contact with a second terminal of an adjacent cell block, and a bridge connecting the first plate to the second plate,
the method comprising:
fitting the battery cell into the housing through the open side of the housing; and
pushing the cell fixation through the open side into the housing, thereby fixing the battery cell in the housing and at least partially closing the housing, the battery cell being aligned with the bond opening of the cell fixation.

13. The method according to claim 12, wherein fitting the battery cell into the housing includes pushing the battery into the cell-insertion opening provided in the base of the housing that opposite the open side.

14. The method according to claim 13, further comprising:
applying and securing a first terminal-connection plate and a second terminal-connection plate to the housing, such that a first contact plate of the first terminal-connection plate contacts a collar of the cell fixation, and a second contact plate of the second terminal-connection plate is fastened on the base of the housing; and
bonding the second contact plate with a bottom side of the battery cell.

15. The method according to claim 14, further comprising:
installing, after bonding the second contact plate, the cell block on a cooling plate; and
bonding, after installing the cell block on the cooling plate, a side of the battery cell facing away from the cooling plate with the first plate of the first terminal connection plate.

* * * * *

UNITED STATES PATENT AND TRADEMARK OFFICE
CERTIFICATE OF CORRECTION

| | |
|---|---|
| PATENT NO. | : 11,139,520 B2 |
| APPLICATION NO. | : 14/260686 |
| DATED | : October 5, 2021 |
| INVENTOR(S) | : Karsten Rüter et al. |

Page 1 of 1

It is certified that error appears in the above-identified patent and that said Letters Patent is hereby corrected as shown below:

In the Claims

Claim 13, Column 20, Line 37, "that opposite" should read as --that is opposite--.

Signed and Sealed this
Twenty-fifth Day of April, 2023

Katherine Kelly Vidal
*Director of the United States Patent and Trademark Office*